United States Patent
Chang et al.

(10) Patent No.: US 8,374,138 B2
(45) Date of Patent: Feb. 12, 2013

(54) FEMTOCELL BASE STATION APPARATUS AND SELF-CONFIGURING METHOD THEREOF

(75) Inventors: Sung Cheol Chang, Daejeon (KR); Chul Sik Yoon, Seoul (KR); Jee Hwan Ahn, Daejeon (KR); Young Jin Sang, Seoul (KR); Kwang Soon Kim, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 476 days.

(21) Appl. No.: 12/609,305

(22) Filed: Oct. 30, 2009

(65) Prior Publication Data

US 2010/0111022 A1    May 6, 2010

(30) Foreign Application Priority Data

Oct. 31, 2008  (KR) .................... 10-2008-0108045
Sep. 29, 2009  (KR) .................... 10-2009-0092599

(51) Int. Cl.
*H04W 4/00* (2009.01)
(52) U.S. Cl. ........................... 370/329; 370/338
(58) Field of Classification Search .............. 370/329, 370/338
See application file for complete search history.

(56) References Cited

U.S. PATENT DOCUMENTS

2009/0247172 A1*  10/2009  Palanki et al. ............... 455/447
2009/0310555 A1*  12/2009  Huo et al. ..................... 370/329
2010/0027694 A1*   2/2010  Touboul et al. .............. 375/260

* cited by examiner

*Primary Examiner* — Sai-Ming Chan
(74) *Attorney, Agent, or Firm* — Jefferson IP Law, LLP

(57) ABSTRACT

A self-configuring method of a femtocell base station extracts preambles from signals received from adjacent macrocells and femtocells. Transmission power of the femtocell base station is set using the extracted macrocell preambles. In addition, the preambles of the femtocell base station are selected using the correlation values between the macrocell preambles and the pre-stored femtocell preambles. Moreover, the resources for data transmission of the femtocell base station are allocated considering the adjacent macrocells and the femtocells.

18 Claims, 24 Drawing Sheets

FIG. 11
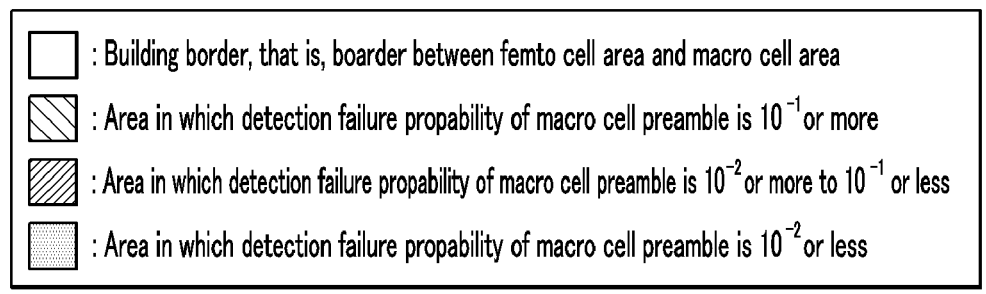
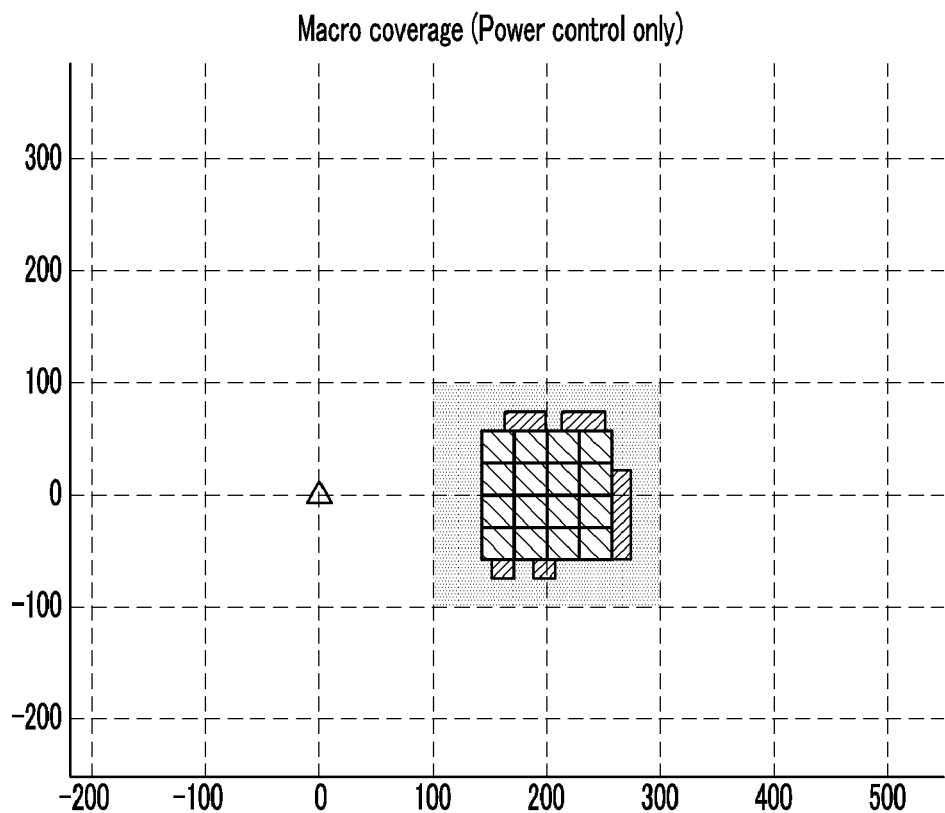

FIG. 13
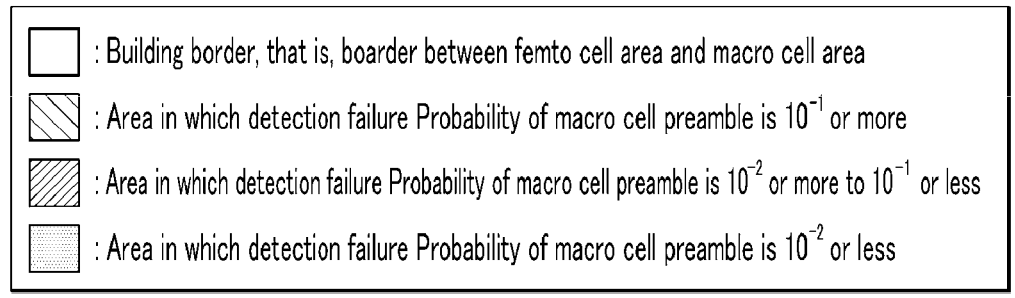
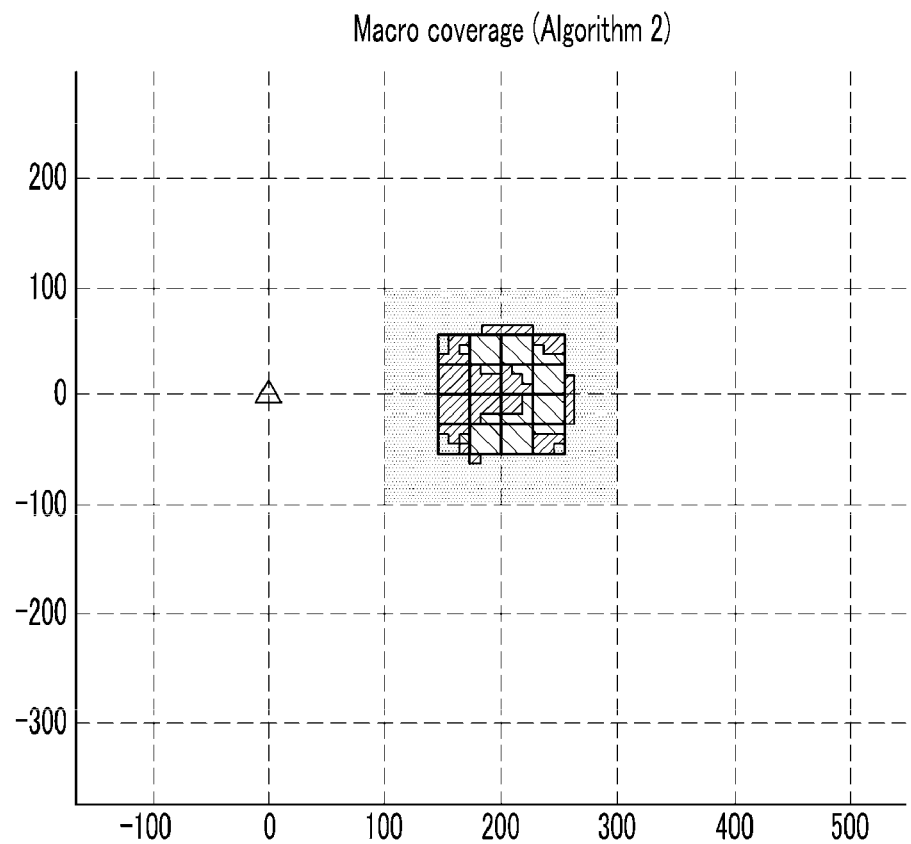

FIG. 14
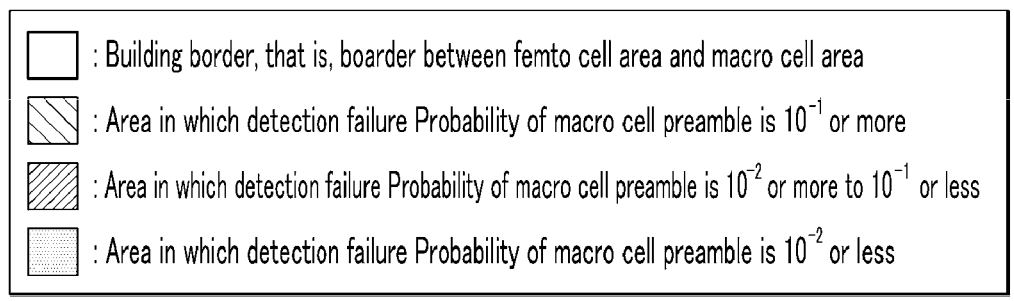
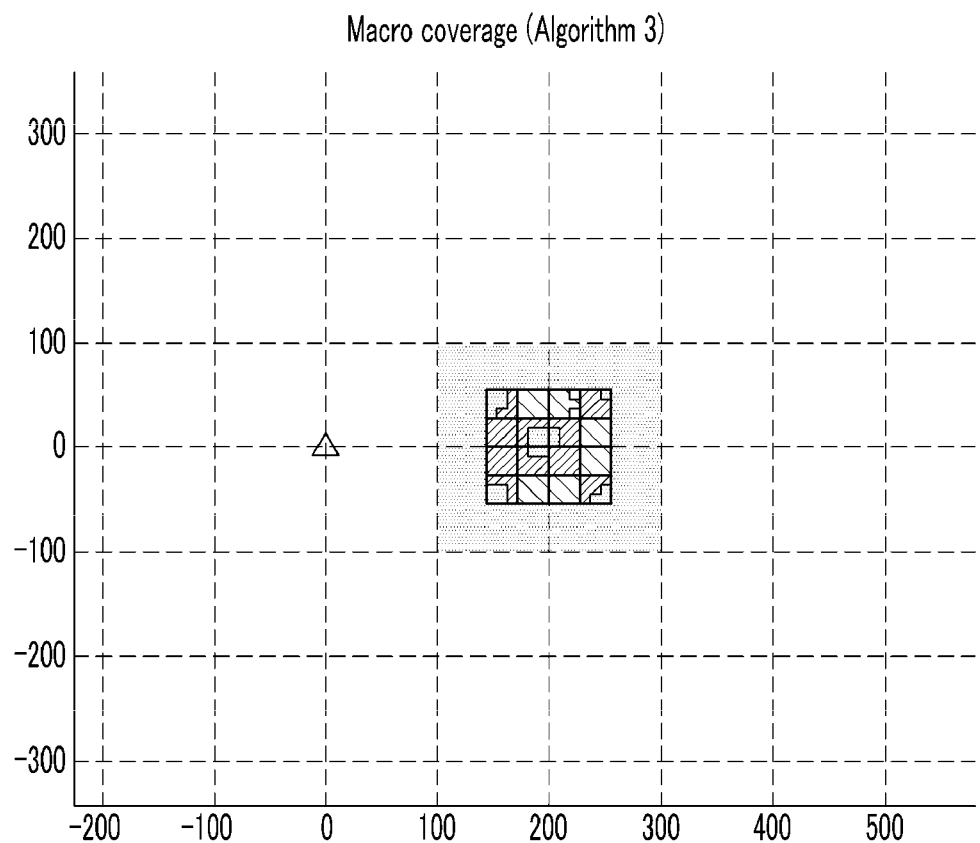

FIG. 15
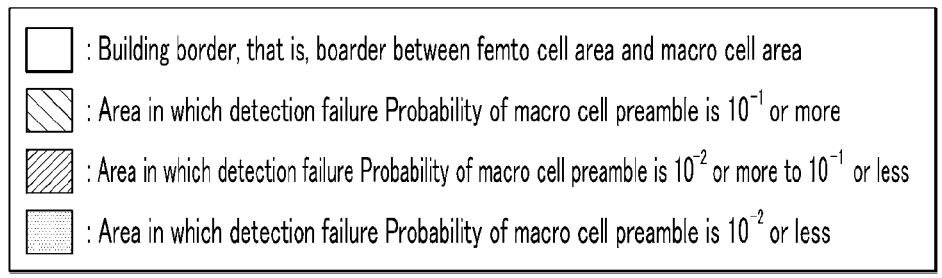
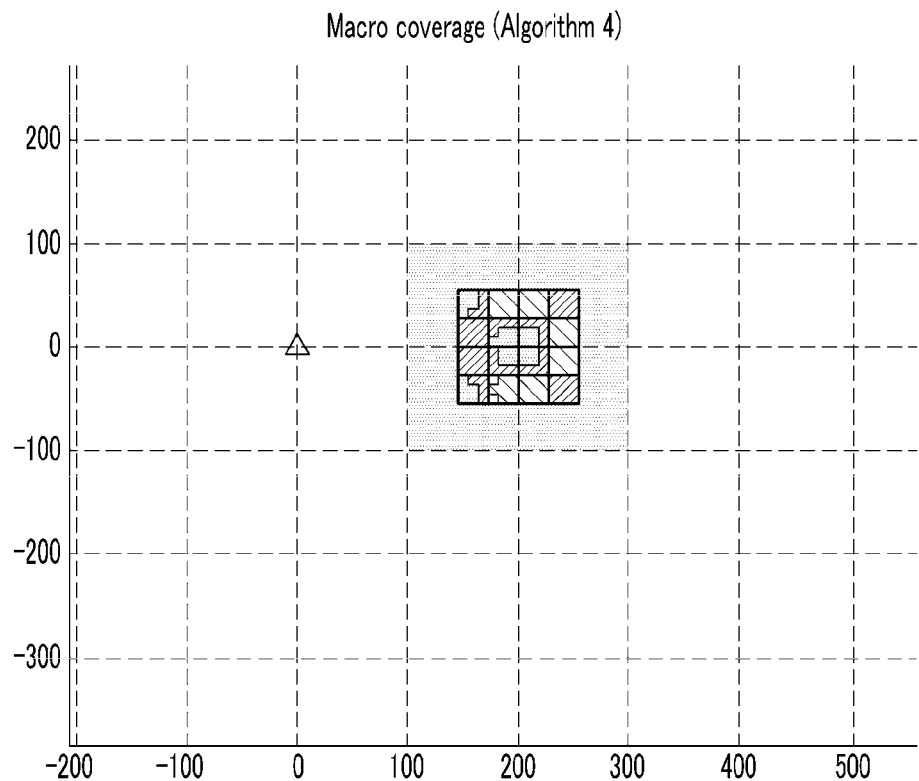

FIG. 16
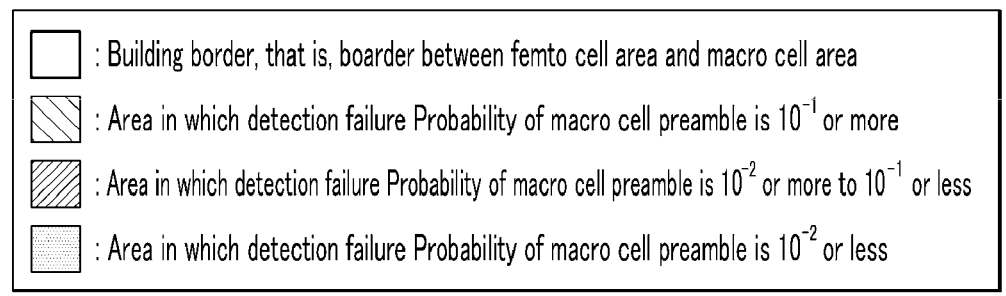
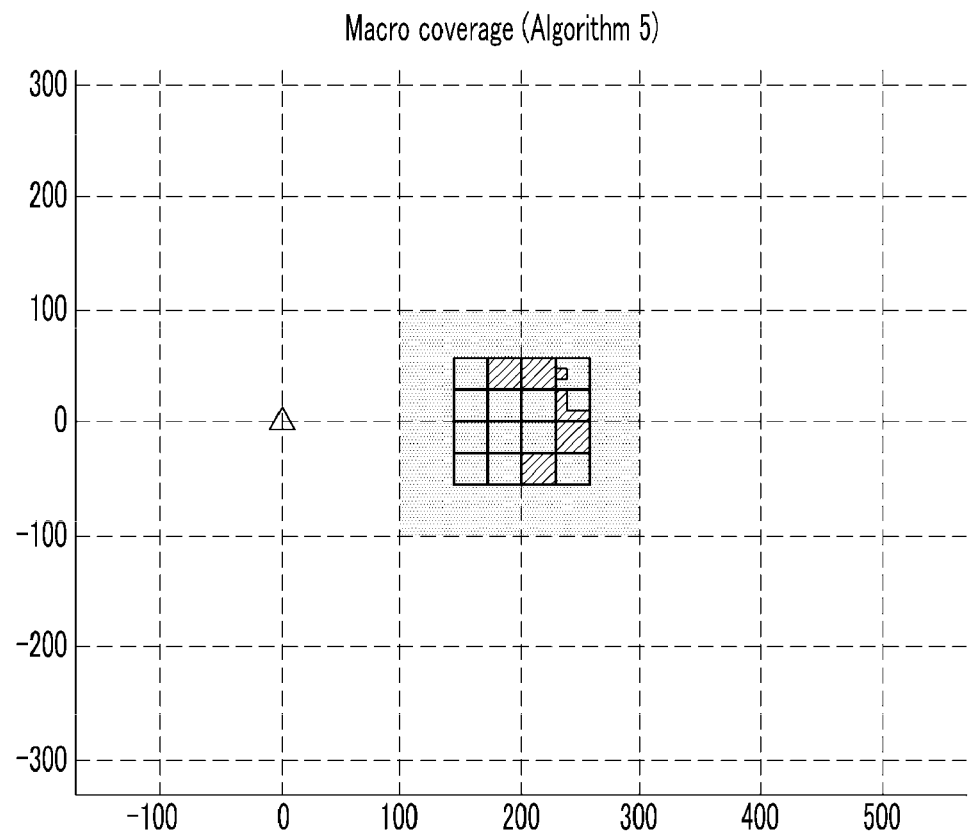

FIG. 17
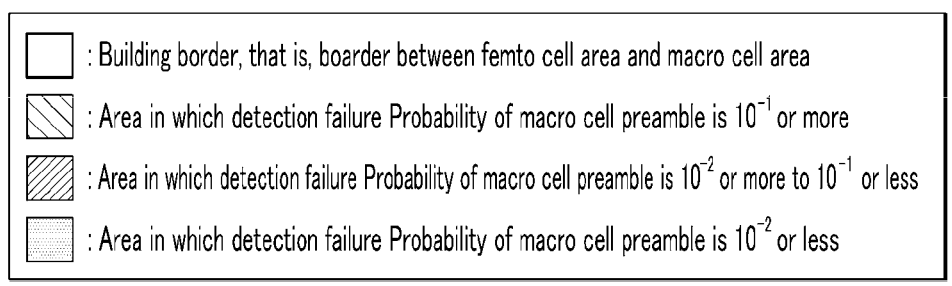
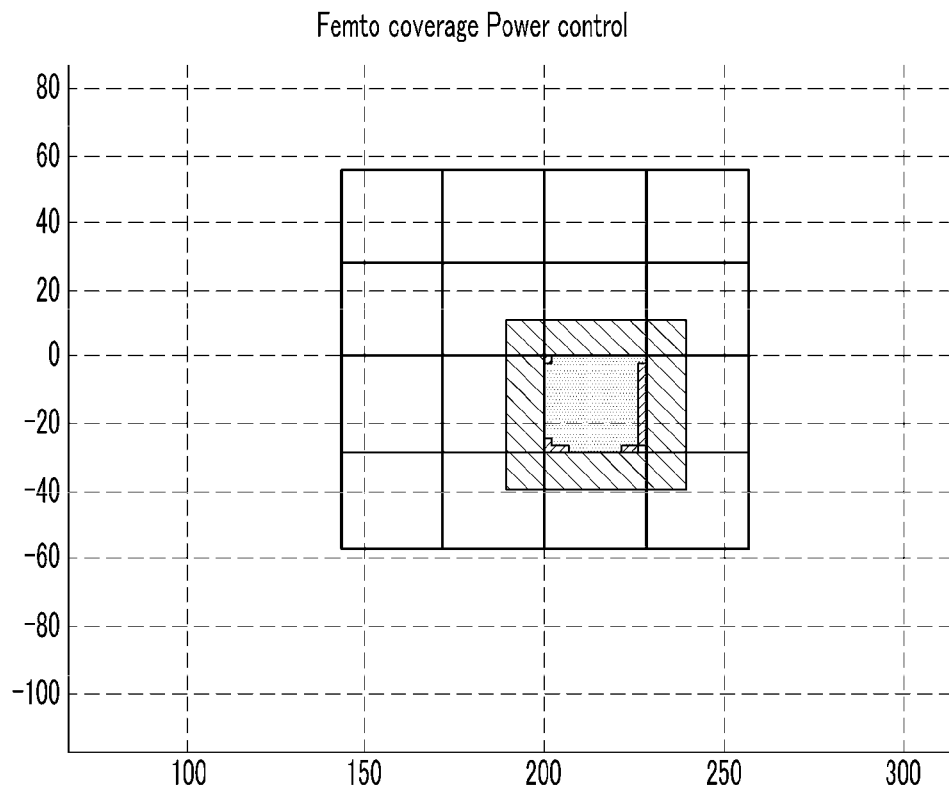

FIG. 19
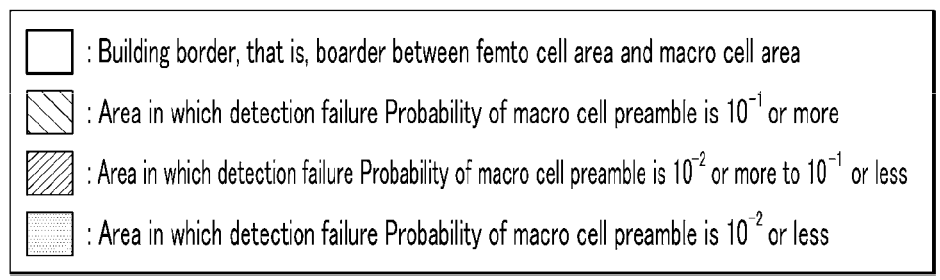
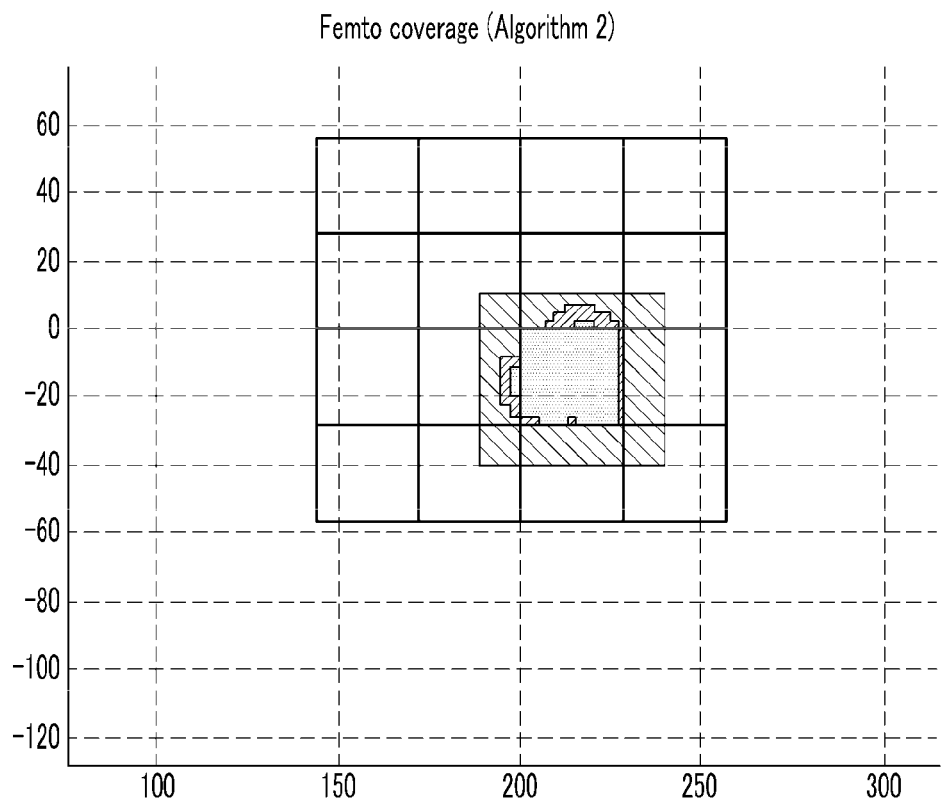

FIG. 22
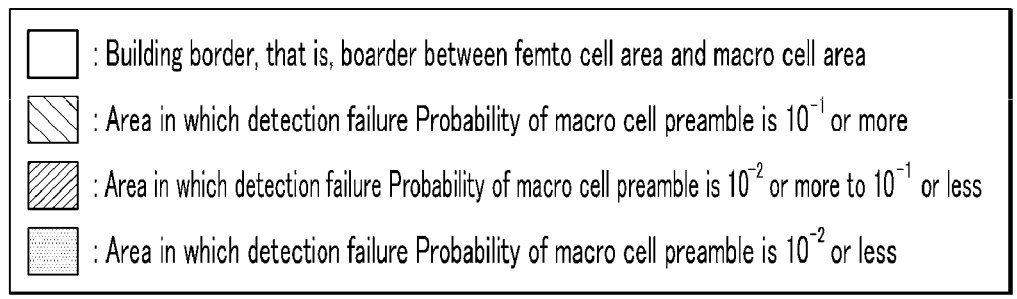
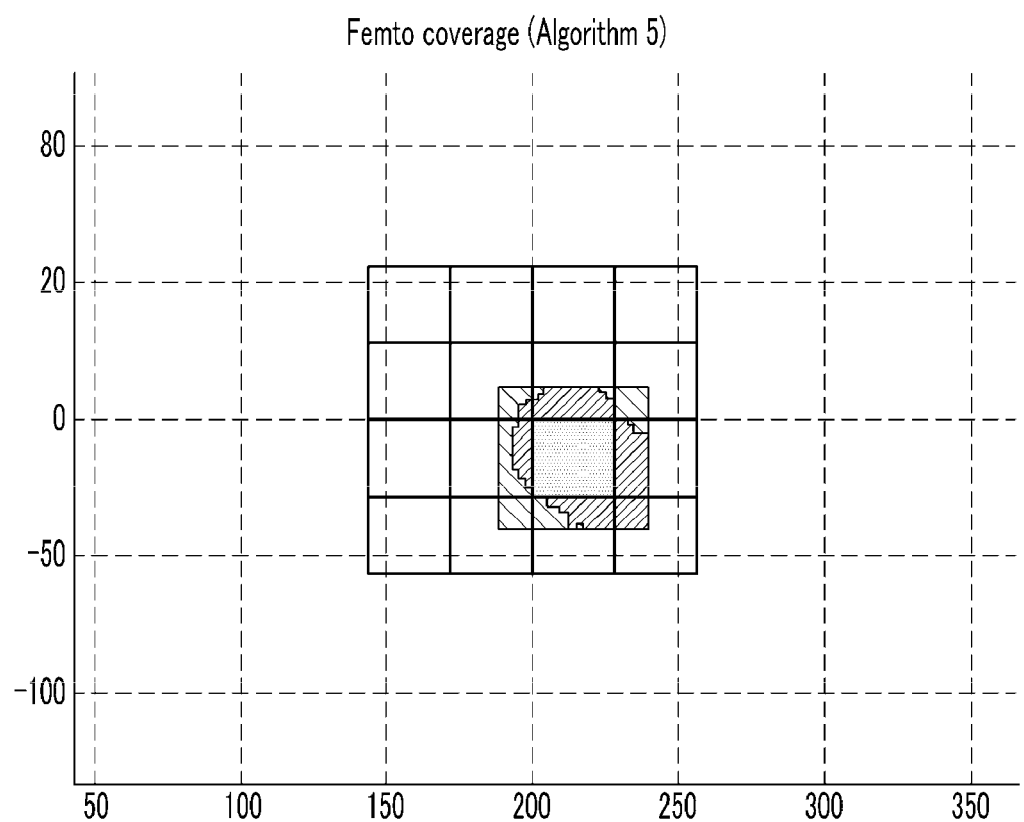

FEMTOCELL BASE STATION APPARATUS AND SELF-CONFIGURING METHOD THEREOF

CROSS-REFERENCE TO RELATED APPLICATION

This application claims priority to and the benefit of Korean Patent Application Nos. 10-2008-0108045 and 10-2009-0092599 filed in the Korean Intellectual Property Office on Oct. 31, 2008 and Sep. 29, 2009, the entire contents of which are incorporated herein by reference.

BACKGROUND OF THE INVENTION (a) Field of the Invention

The present invention relates to a femtocell base station apparatus and a self-configuring method thereof. More specifically, the present invention relates to a femtocell base station apparatus that senses peripheral macrocell environments, performs self-configuration, and allocates resources according to situations, when an orthogonal frequency division multiple access (OFDMA)-based cellular mobile communication network is installed with a femtocell base station apparatus, and a self-configuring method thereof.

(b) Description of the Related Art

A femtocell, which is a micro base station providing mobile communication services to an area within about a 30 m radius, may be referred to as a home node-B. The femtocell is installed at an area that degrades the radio waves of the macrocell, such as a home or building or a shadow area, to compensate for the quality of the mobile communication services.

The existing femtocell base station is developed based on a code division multiple access (CDMA) network to expand the cell area. The OFDMA-based femtocell base station has not been commercialized until now.

Currently, in standardization organizations such as the 3rd Generation Partnership Project (3GPP), the 3rd Generation Partnership Project Long Term Evolution (3GPP LTE), and the Institute of Electrical and Electronics Engineers (IEEE) 802.16m, study of standard technologies and requirements for the femtocell base station are being actively performed.

However, there are many problems to be solved in the OFDMA-based femtocell-based system.

The access scheme of the femtocell is classified into a closed network that permits access only to authenticated users and an open network that permits access to all users. In the case of the open network, there is a problem in that priority of handover may be same, which can be easily solved by setting a handover threshold value, etc.

However, in the case of the closed network, since the femtocell base station is installed in a macrocell coverage area, there may be a case where the femtocell base station is not smoothly operated due to interferences of the macrocell base stations when the femtocell base station is installed without separate configuration.

On the other hand, when macrocell terminals are in the femtocell base station area, a case may occur where the communication of the macrocell terminal is impossible due to interference of the femtocell base station.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a femtocell base station apparatus having advantage of minimizing damage of macrocells by performing self-configuration to minimize interference to adjacent macrocell or other femtocells and allowing the femtocell to maximally secure its own area, and a self-configuring method thereof.

An exemplary embodiment of the present invention provides a femtocell base station apparatus. The femtocell base station apparatus that is installed at a home positioned in a macrocell coverage area to have a separate femtocell coverage area includes: a power allocator that uses macrocell preambles extracted from signals received from adjacent macrocells and femtocells to set transmission power; a preamble selector that uses correlation values between the macrocell preambles and pre-stored femtocell preambles to select femtocell preambles; and a resource allocator that allocates resources for data transmission in the femtocells, considering signal interference size between the adjacent macrocells and the femtocells.

Another exemplary embodiment of the present invention provides a self-configuring method of a femtocell base station. The self-configuring method of a femtocell base station includes: extracting preambles from signals received from adjacent macrocells and femtocells; setting transmission power of the femtocell base station using the extracted macrocell preambles; selecting the preambles of the femtocell base station using the correlation values between the macrocell preambles and the pre-stored femtocell preambles; and allocating resources for data transmission of the femtocell base station, considering signal interference size between the adjacent macrocells and the femtocells.

BRIEF DESCRIPTION OF THE DRAWINGS

FIG. 11 is a diagram showing the detection performance of a macrocell preamble within a femtocell coverage area when a preamble to which only power allocation is applied is used;

FIG. 13 is a diagram showing the detection performance of a macrocell preamble within a femtocell coverage area when a preamble select algorithm according to the second embodiment of the present invention is used;

FIG. 14 is a diagram showing the detection performance of a macrocell preamble within a femtocell coverage area when a preamble select algorithm according to the third embodiment of the present invention is used;

FIG. 15 is a diagram showing the detection performance of a macrocell preamble within a femtocell coverage area when another preamble select algorithm according to the fourth embodiment of the present invention is used;

FIG. 16 is a diagram showing the detection performance probability of a macrocell preamble within a femtocell coverage area when yet another preamble selector according to the fifth embodiment of the present invention selects a preamble;

FIG. 17 is a diagram showing the detection performance of a femtocell preamble within a femtocell coverage area when a preamble to which only power allocation is applied is used;

FIG. 19 is a diagram showing the detection performance of a femtocell preamble within a femtocell coverage area when a preamble select algorithm according to the second embodiment of the present invention is used;

FIG. 22 is a diagram showing the detection performance of a femtocell preamble within a femtocell coverage area when a preamble select algorithm according to the fifth embodiment of the present invention is used;

DETAILED DESCRIPTION OF THE EMBODIMENTS

Figure 1:
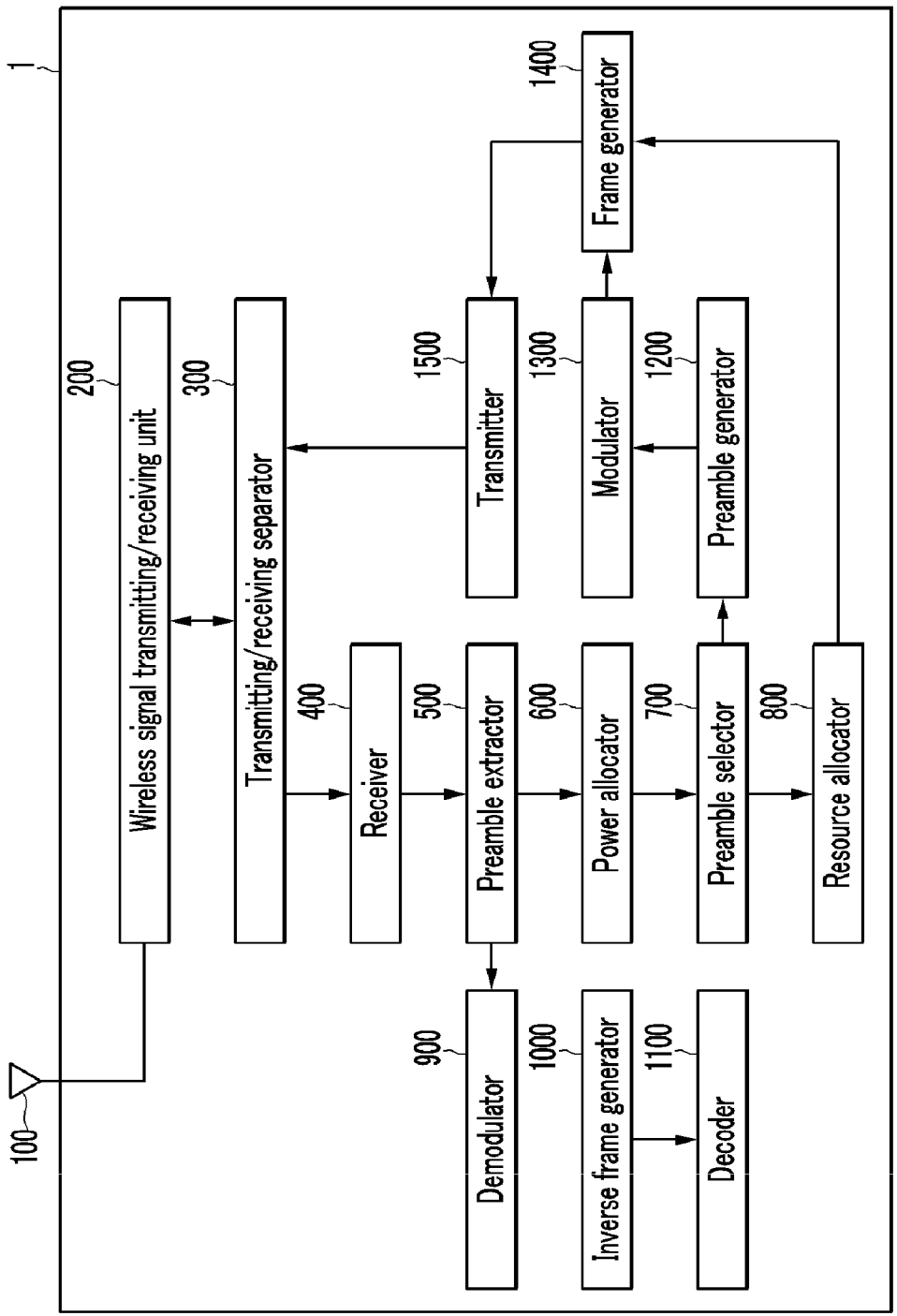
FIG. 1 is a block diagram showing an internal configuration of a femtocell base station apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

Hereinafter, a femtocell base station and a self-configuring method according to an exemplary embodiment of the present invention will be described in detail with the accompanying drawings.

FIG. 1 is a block diagram showing an internal configuration of a femtocell base station apparatus according to an exemplary embodiment of the present invention.

Referring to FIG. 1, a femtocell base station apparatus 1 includes an antenna 100, a wireless signal transmitting/receiving unit 200, a transmitting/receiving separator 300, a receiver 400, a preamble extractor 500, a power allocator 600, a preamble selector 700, a resource allocator 800, a demodulator 900, an inverse frame generator 1000, a decoder 1100, a preamble generator 1200, a modulator 1300, a frame generator 1400, and a transmitter 1500.

The wireless signal transmitting/receiving unit 200 transmits/receives signals from femtocells and macrocells through the antenna 100.

The transmitting/receiving separator 300 separates received signals that are applied from the antenna 100 and signals that are transmitted from the transmitter 1500.

The receiver 400 receives the signals from the femtocells and the macrocells that are separated by the transmitting/receiving separator 300.

The preamble extractor 500 extracts preambles from the signals from the femtocells and the macrocells that are received by the receiver 400. At this time, they are separated into signals corresponding to the femtocells and signals corresponding to the macrocells. The signals from the femtocells are transmitted to the demodulator 900 and the signals from the macrocells and the femtocells are transferred to the power allocator 600.

The power allocator 600 allocates the transmission power of the femtocell base station apparatus 1 at an initialization step using the following Equation 1. In other words, the transmission power is determined using the signals from the macrocells, which are received by the receiver 400.

$$P_{femto}(dB) = \min(P_{macro-rx} + L(d) + G, P_{femto-max}) \quad \text{[Equation 1]}$$

Herein, $P_{macro-rx}$ the receiving power of the signal received from the macrocell, L(d) is path attenuation when an area radius of the femtocell base station apparatus 1 is defined by d, G is a gain value of the transmission power of the femtocell base station apparatus 1, and $P_{femto-max}$ is a maximum transmission power of the femtocell base station apparatus 1, The preamble selector 700 selects the preambles after the initial power is allocated by the power allocator 600. At this time, as the preambles, a preamble according to IEEE 802.16e can be used. The preamble signal that is necessary for searching a cell is positioned at a first symbol of a frame, and uses a binary phase shift keying (BPSK) modulation scheme.

The preamble signal uses different sets of subcarriers according to segments. In the case of an IEEE 802.16e-based OFDMA system, the preamble signal has a total of three segments. The preamble signals are allocated with a set of subcarriers that are not overlapped with each other for each segment. There are a total of 114 preambles. 114 preamble signals are allocated with 38 usable preambles for each segment.

The preamble selector 700 may use the IEEE 802.16e-based preambles and at the same time, may use twice as many preambles as the existing preambles or preambles punctured in several patterns. The punctured preambles will be described in detail with reference to FIG. 2.

The resource allocator 800 does not repeat a fundamental channel (FCH) signal four times but repeats a fundamental channel (FCH) signal fewer times, such that it can configure the FCH signal to exist at different positions for each subsegment. The FCH signal includes a position of a MAP signal and the associated information.

The resource allocator 800 allocates resources to be used for the femtocell data transmission after the preamble and the MAP/FCH are allocated.

The demodulator 900 demodulates the signals from the femtocells from which the preambles are removed by the preamble extractor 500.

The inverse frame generator 1000 inversely frames the signals from the femtocell demodulated by the demodulator 900.

The decoder 1100 decodes the signals from the femtocells, which are inversely framed by the inverse frame generator 1000.

The preamble generator 1200 generates the preambles selected by the preamble selector 700.

The modulator 1300 modulates the preambles generated by the preamble generator 1200.

The frame generator 1400 generates frames using the preambles modulated by the modulator 1300 and the resources allocated by the resource allocator 800.

The transmitter 1500 transmits the frames generated by the frame generator 1400 to the wireless signal transmitting/receiving unit 200 through the transmitting/receiving separator 300. Then, the wireless signal transmitting/receiving unit 200 transmits these frames to the outside through the antenna 100.

Figure 2:
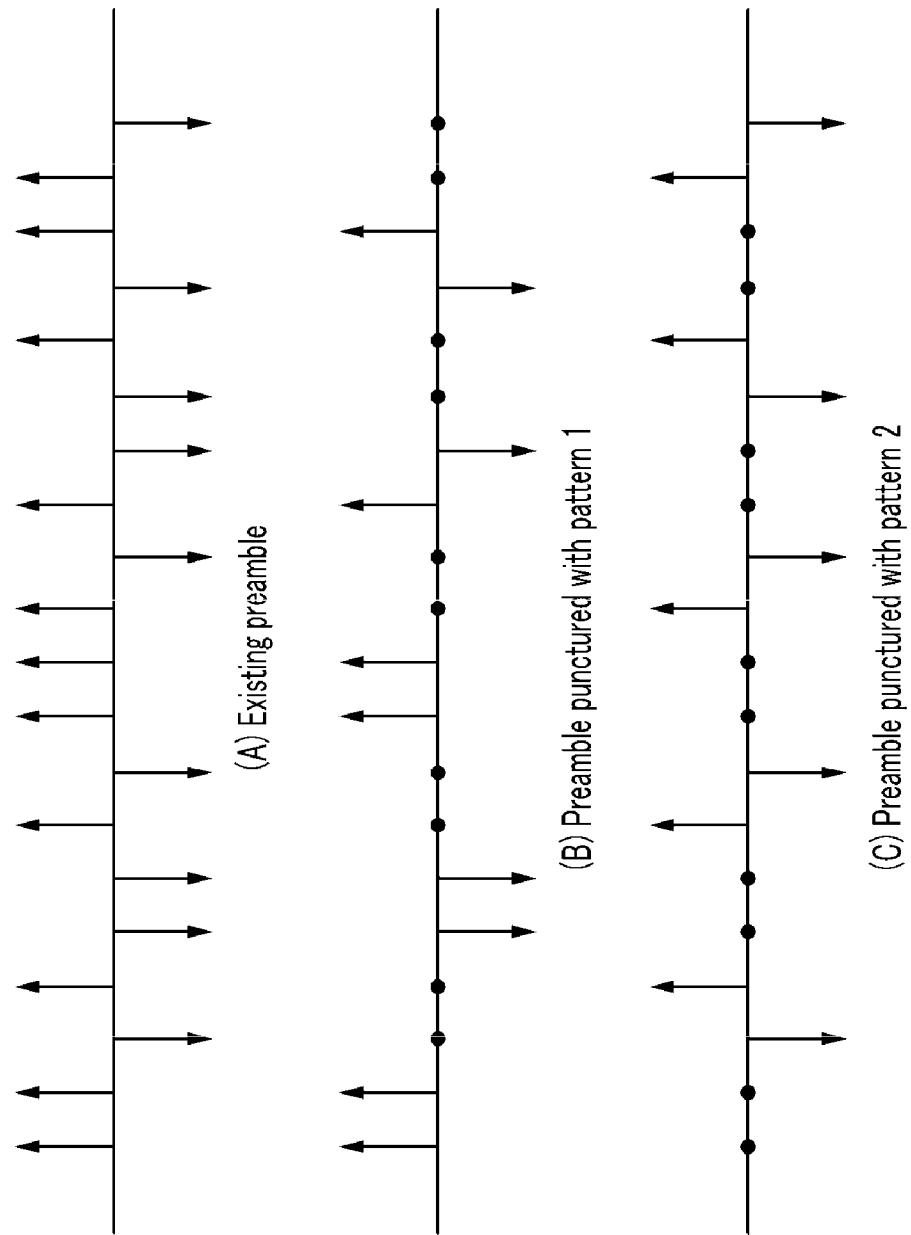
FIG. 2 is a diagram showing a preamble according to an exemplary embodiment of the present invention.

FIG. 2 shows the preambles according to the exemplary embodiment of the present invention. In particular, (A) of FIG. 2 shows the existing preamble. (B) of FIG. 2 shows a double-punctured preamble with pattern 1. (C) of FIG. 2 shows a double-punctured preamble with pattern 2.

Herein, as shown in (A) and (B) of FIG. 2, when the preamble is punctured in two patterns, one preamble can be used by being divided into two preambles. In addition, when the double-punctured preamble is used, each segment can use a virtual segment that plays the same role as two subsegments below each segment.

Further, the number of usable preambles for each segment increases by twice. In other words, as the multiple to be punctured increases, more subsegments and preambles can be used.

Hereinafter, FIGS. 3 to 7 each describe five exemplary embodiments of the preamble select algorithm of the preamble selector 700. At this time, a configuration of performing the same function in each exemplary embodiment uses the same reference numerals, and repeated descriptions of the configuration will be omitted.

Figure 3:
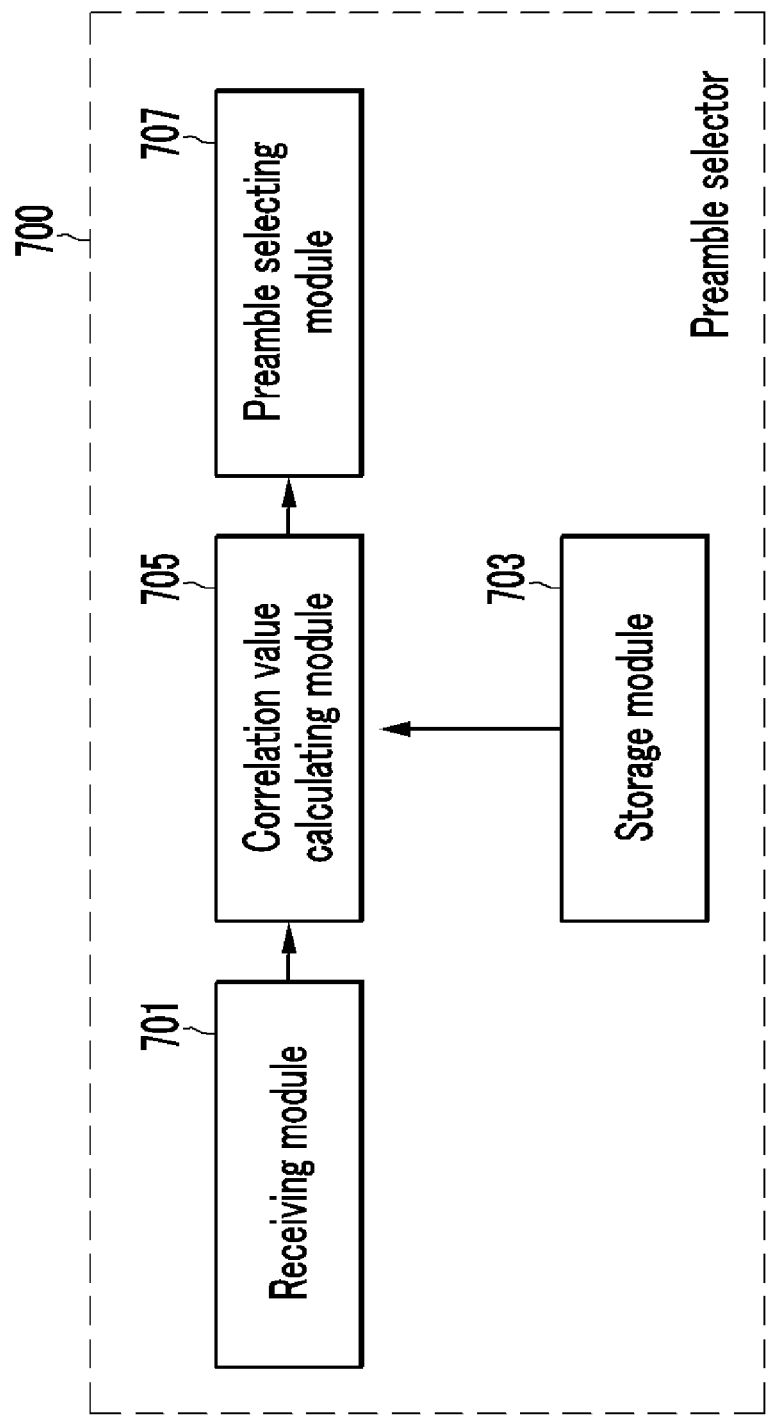
FIG. 3 is a block diagram showing a detailed configuration of a preamble selector according to a first exemplary embodiment of the present invention.

FIG. 3 is a block diagram showing a detailed configuration of a preamble selector according to a first exemplary embodiment of the present invention. In other words, the configuration of the first preamble select algorithm will be described.

Referring to FIG. 3, the preamble selector 700 includes a receiving module 701, a storage module 703, a correlation value calculating module 705, and a preamble selecting module 707.

The receiving module 701 receives macrocell preambles from the power allocator 600.

The storage module 703 stores the femtocell preambles. In other words, the storage module 703 stores an IEEE 802.16e-based femtocell preamble.

The correlation value calculating module 705 receives a signal $Y_{j,k}$ corresponding to a k-th subcarrier of a j-th preamble of a macrocell preamble from the receiving module 701. The correlation value calculating module 705 receives a signal $D_{j,k}$ of the k-th subcarrier of the j-th preamble from the storage module 703.

The correlation value calculating module 705 uses $Y_{j,k}$ and $D_{j,k}$ to calculate a differential correlation value ($\eta_j$) using a differential vector like the following Equation 2.

$$\eta_j = \left\{ \frac{2}{K} \sum_{k=0}^{K/2-1} \text{Re}(R_k) P_{j,k} \right\} \quad \text{[Equation 2]}$$

Herein, $R_k = Y_{j,2k} Y_{j,2k+1}^*$, and $P_k = D_{j,2k} D_{j,2k+1}$. At this time, K indicates the sequence number of preambles.

The preamble selecting module 707 receives the differential correlation values calculated using Equation 2 for all the preambles from the correlation value calculating module 705. The index of the preamble of the lowest correlation values of the received differential correlation values is selected as the preamble to be used by the femtocell base station apparatus 1.

Figure 4:
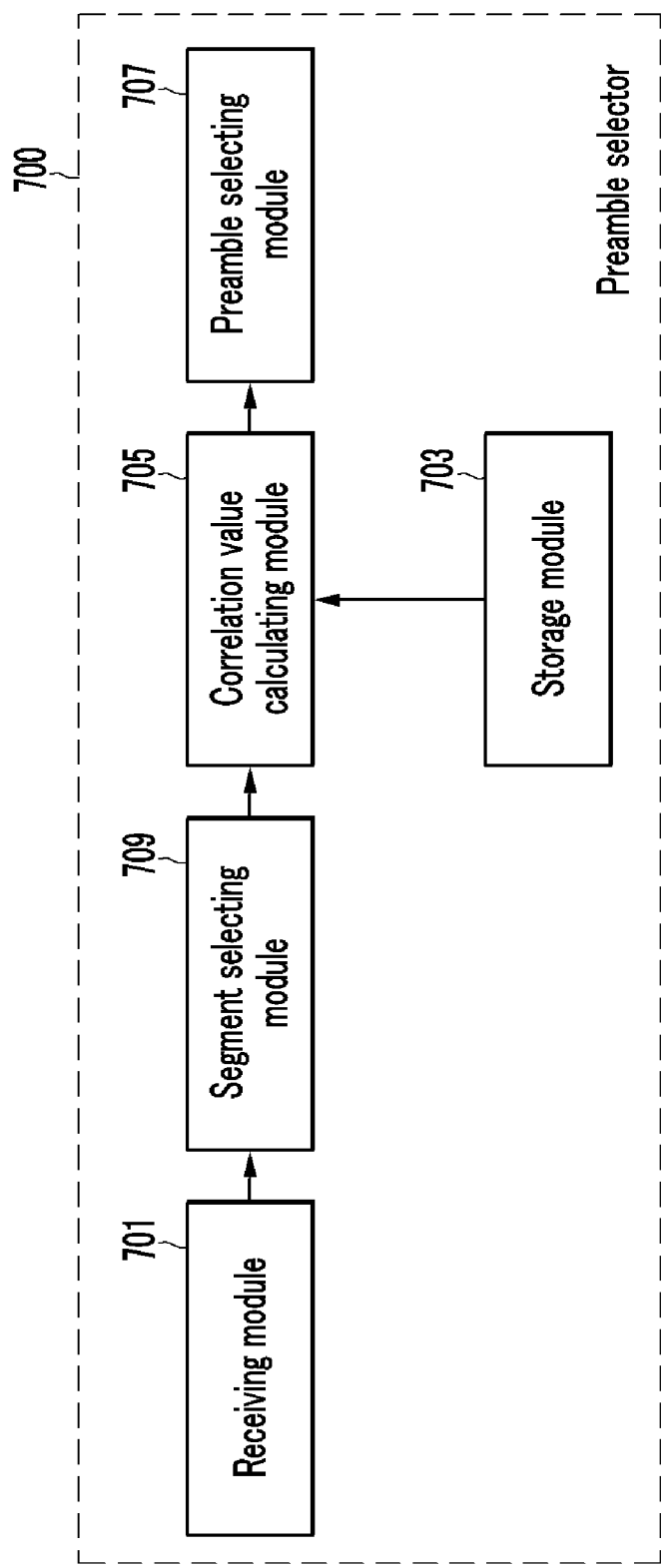
FIG. 4 is a block diagram showing a detailed configuration of a preamble selector according to a second exemplary embodiment of the present invention.

FIG. 4 is a block diagram showing a detailed configuration of a preamble selector according to a second exemplary embodiment of the present invention. In other words, a configuration of the second preamble select algorithm will be described.

Referring to FIG. 4, the preamble selector 700 includes the receiving module 701, the storage module 703, a segment selecting module 709, the correlation value calculating module 705, and the preamble selecting module 707.

The segment selecting module 709 selects segments to be used by the femtocell base station apparatus 1. The segment selecting module 709 selects a segment (S) that is lowest of a sum of the received signal energy of each segment like the following Equation 3. At this time, the sum of the received signal energy of the segments can be obtained by accumulating one preamble or a plurality of preambles.

$$s = \underset{s}{\arg\min} \sum_{k \in C_s} |Y_k|^2 \quad \text{[Equation 3]}$$

Herein, $C_S$ indicates a set of subcarriers corresponding to a s-th segment, and $Y_k$ indicates a k-th carrier signal in the received signal.

The correlation value calculating module 705 does not calculate the differential correlation value of all the preambles, but calculates the differential correlation values of the preamble of the segment selected by the segment selecting module 709 and the femtocell preamble stored in the storage module 703 by using Equation 2.

Figure 5:
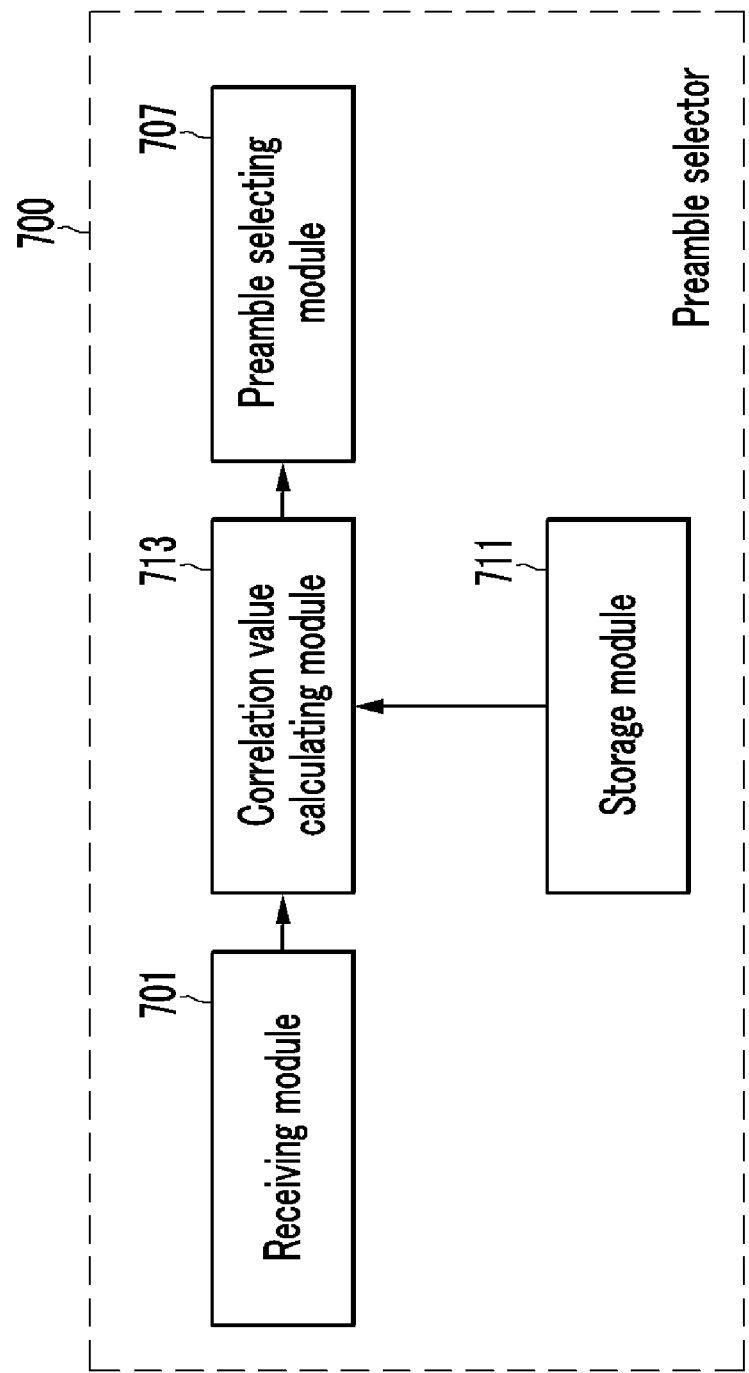
FIG. 5 is a block diagram showing a detailed configuration of a preamble selector according to a third exemplary embodiment of the present invention.

FIG. 5 is a block diagram showing a detailed configuration of a preamble selector according to a third exemplary embodiment of the present invention. In other words, a configuration of the third preamble select algorithm will be described.

Referring to FIG. 5, the preamble selector 700 includes the receiving module 701, a storage module 711, a correlation value calculating module 713, and the preamble selecting module 707.

The storage module 711 stores the femtocell preambles punctured by the number of designated patterns described in FIGS. 2B and 2C. The total number of preambles increases as many as the multiple of the number of punctured patterns as compared to the number of existing preambles. For example, when the patterns are punctured twice, the number of preambles whose correlation value should be obtained is 228.

The correlation value calculating module 713 applies the punctured femtocell preamble stored in the storage module 711 to calculate the correlation value with the j-th preamble using the following Equation 4.

$$\eta_j = \left\{ \frac{2 \cdot punc}{K} \sum_{k=0}^{K/(2 \cdot punc)-1} \text{Re}(R_k) P_{j,k} \right\}$$ [Equation 4]

Herein, punt indicates the number of punctured patterns.

Figure 6:
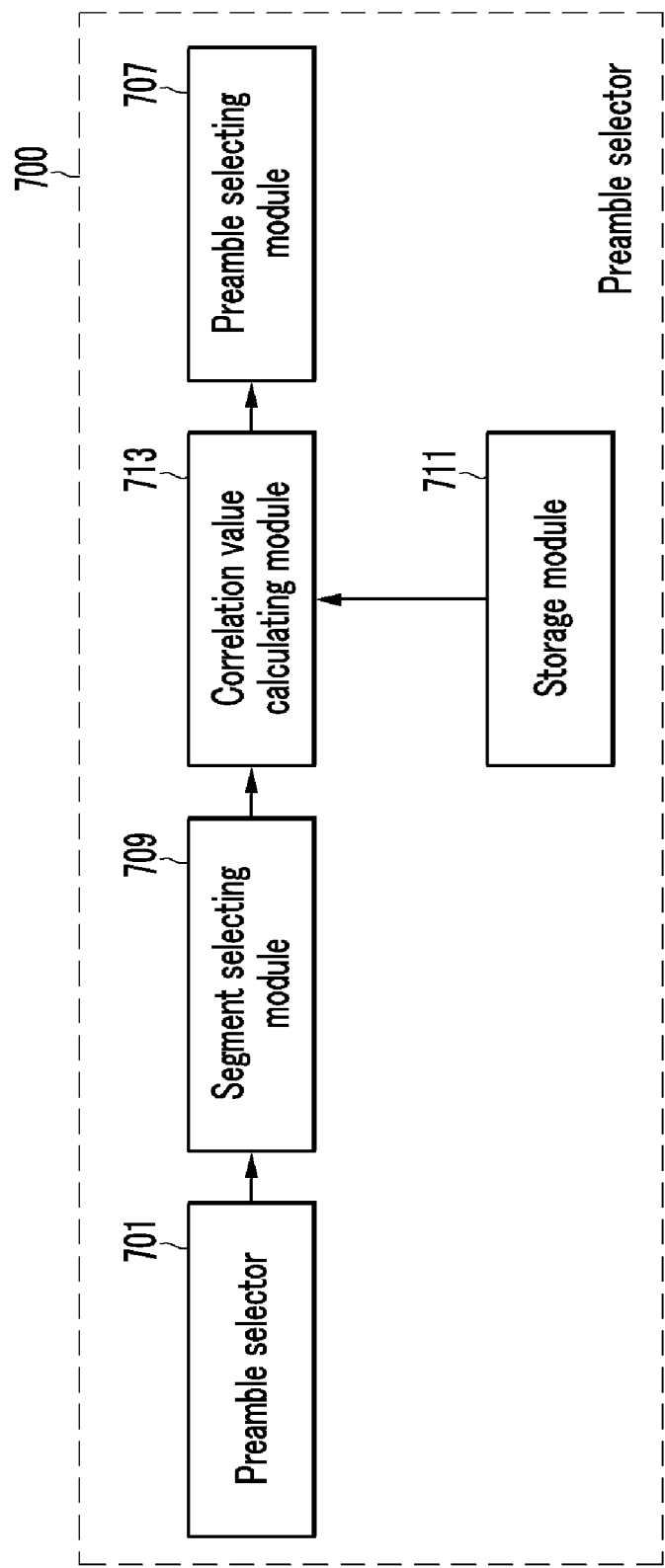
FIG. 6 is a block diagram showing a detailed configuration of a preamble selector according to a fourth exemplary embodiment of the present invention.

FIG. 6 is a block diagram showing a detailed configuration of a preamble selector according to a fourth exemplary embodiment of the present invention. In other words, a configuration of the fourth preamble select algorithm will be described.

Referring to FIG. 6, the preamble selector 700 includes the receiving module 701, the storage module 711, the segment selecting module 709, the correlation value calculating module 713, and the preamble selecting module 707.

The correlation value calculating module 713 calculates the correlation value of the preambles of the segments selected by the segment selecting module 709 and the punctured femtocell preambles stored in the storage module 711 using Equation 4.

Figure 7:
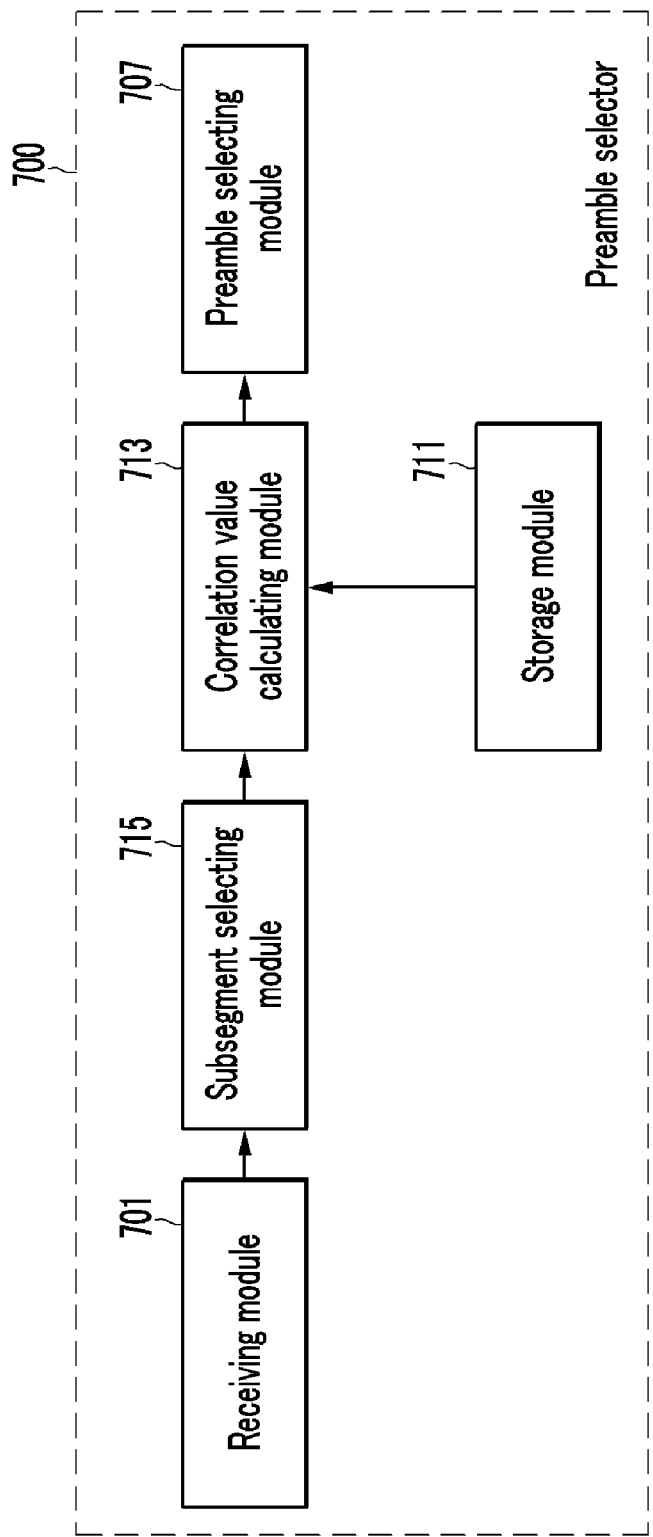
FIG. 7 is a block diagram showing a detailed configuration of a preamble selector according to a fifth exemplary embodiment of the present invention.

FIG. 7 is a block diagram showing a detailed configuration of a preamble selector according to a fifth exemplary embodiment of the present invention. In other words, a configuration of the fifth preamble select algorithm will be described.

Referring to FIG. 7, the preamble selector 700 includes the receiving module 701, the storage module 711, a subsegment selecting module 715, the correlation value calculating module 713, and the preamble selecting module 707.

The subsegment selecting module 715 detects energy for virtual subsegments according to the punctured patterns for the macrocell preambles like the following Equation 5. The subsegment selecting module 715 selects a subsegment that is lowest in the sum of the received signal energy of the subsegments.

$$s = \underset{p}{\operatorname{argmin}} \sum_{k \in C_p} |Y_k|^2$$ [Equation 5]

Herein, $C_p$ indicates a set of p-th subsegment subcarriers.

The correlation value calculating module 713 calculates the correlation value of the preambles of the subsegments selected by the subsegment selecting module 715 and the punctured femtocell preambles stored in the storage module 711 using Equation 4.

In the case of the IEEE 802.16e system, the FCH signal is repeated four times at a position defined according to each segment to configure the FCH signal.

In the case of the third exemplary embodiment, the fourth exemplary embodiment, and the fifth exemplary embodiment of the present invention, the subdivided subsegments, not the existing segments, can be selected. In this case, the resource allocator 800 does not repeat the FCH signal four times but repeats the FCH signal fewer times, such that it can configure the FCH signal to exist at different positions for each subsegment. The FCH includes the position of the MAP and the receiving information.

Figure 8:
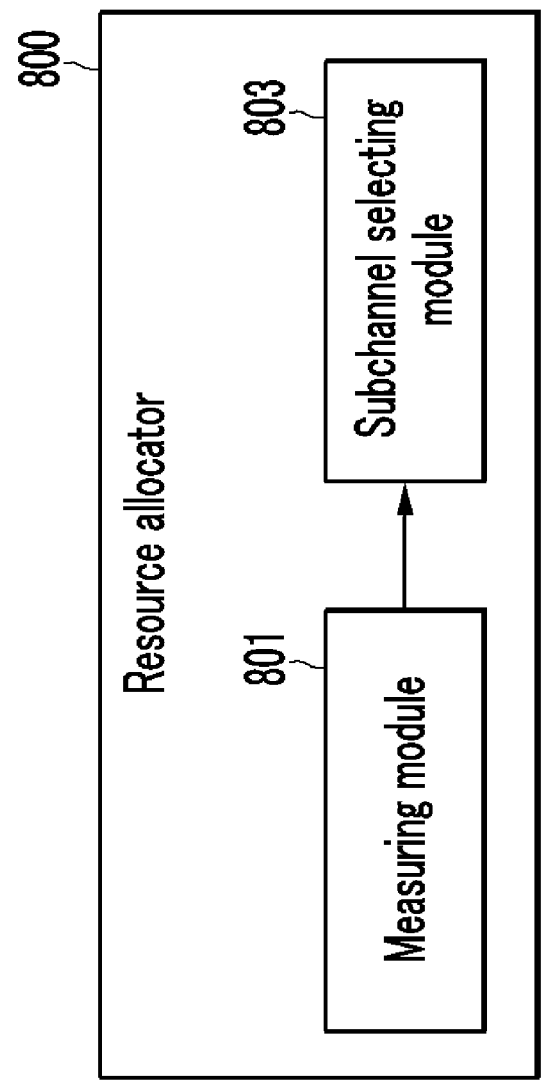
FIG. 8 is a block diagram showing a detailed configuration of a resource allocator according to an exemplary embodiment of the present invention.

FIG. 8 is a block diagram showing a detailed configuration of a resource allocator according to an exemplary embodiment of the present invention.

Referring to FIG. 8, the resource allocator 800 includes a measuring module 801 and subchannel selecting module 803.

The measuring module 801 measures an interference to noise ratio (hereinafter described as "INR") while the preamble selector 700 selects the preambles. At this time, the power of noise can be appreciated by measuring the power of the received signals of a guardband of the OFDM symbol. The interference size between the macrocell and the femtocell can be appreciated by measuring the size of the received signals of the macrocell preamble.

The subchannel selecting module 803 determines the subchannel mechanism used by the femtocell according to the value of the INR measured by the measuring module 801 at an initialization step. In other words, since an area where the INR is low is an area that is far away from the macrocell, the area is affected by noise rather than by interference. When performing the transmission at high power using fewer frequency resources, the femtocell base station apparatus 1 in this area can show a higher data rate.

The subchannel selecting module 803 uses the subchannel in the existing IEEE 802.16e-based full usage of subchannels (FUSC) and partial usage of subchannels (PUSC) types, and at the same time, may use PUSC in a new type having a higher frequency reuse factor according to the selection of each subsegment. Examples of methods for increasing the reuse factor of the subchannels in the existing PUSC type may include several types.

At this time, the interference between the femtocells using different subsegments does not occur by using only 1/N resource that is orthogonal to a time base or a frequency base in the subchannel resource in the existing PUSC type.

Figure 9:
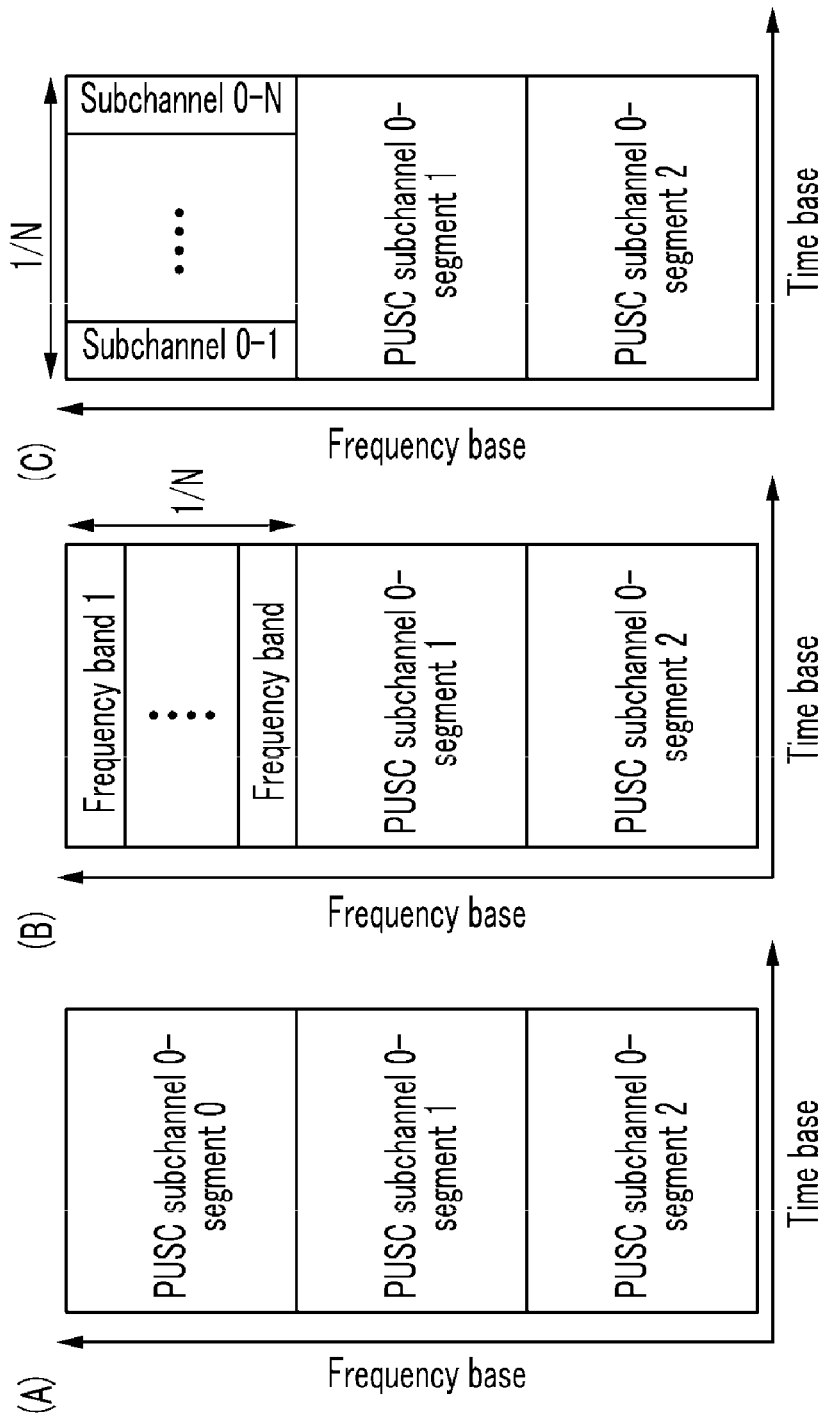
FIG. 9 is a configuration showing a configuration of separating subchannel resources according to an exemplary embodiment of the present invention.

FIG. 9 is a configuration showing a configuration of separating subchannel resources according to an exemplary embodiment of the present invention. In particular, FIG. 9A shows a subchannel configuration, FIG. 9B shows a configuration of separating the subchannel resource into a frequency base, and FIG. 9C shows a configuration of separating the subchannel resource into a time base.

Figure 10:
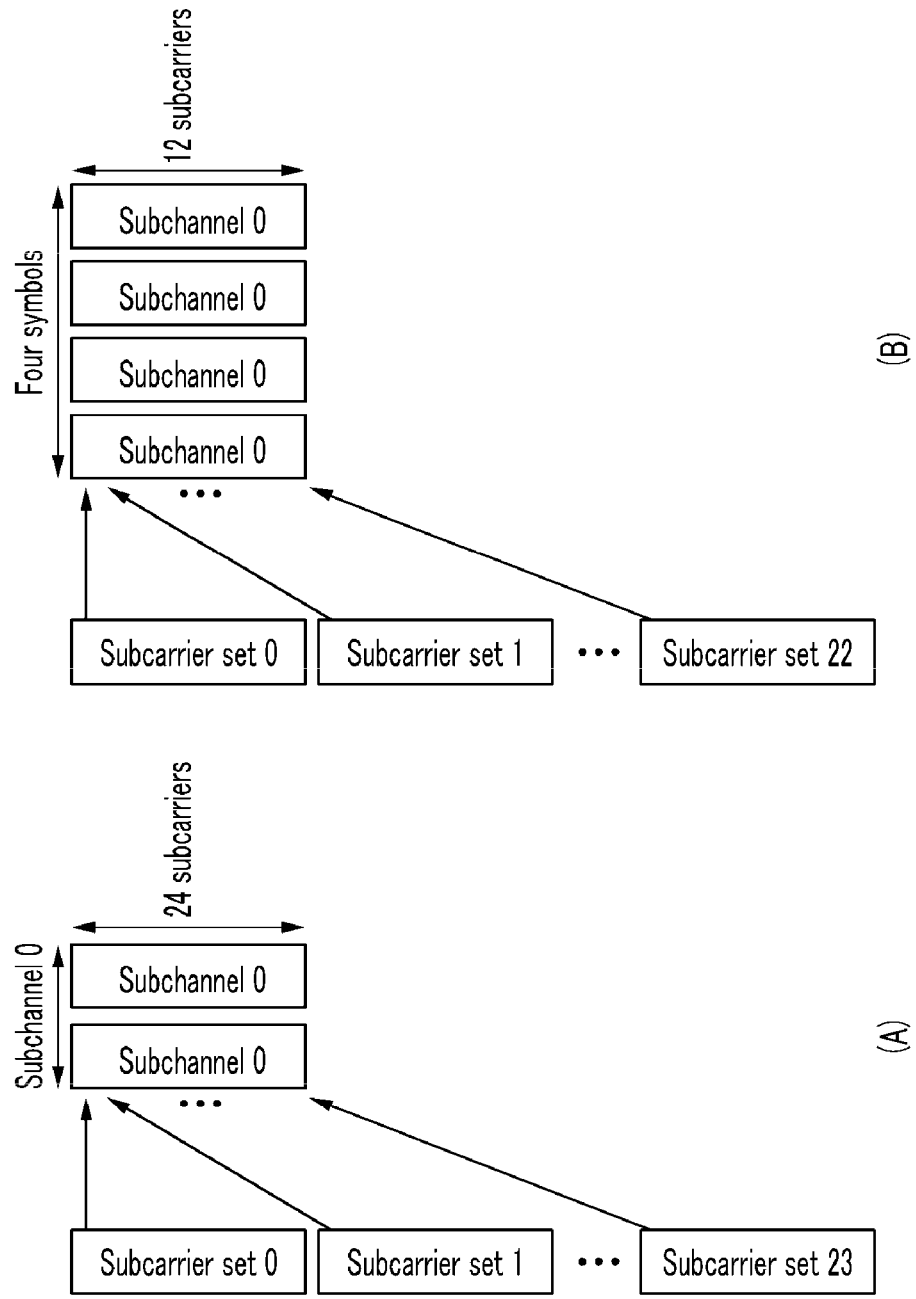
FIG. 10 is a diagram showing an example of allocating resources to a frequency axis when frequency reuse factor according to an exemplary embodiment of the present invention is 2.

Referring to FIGS. 9B and 9C, when the frequency reuse factor is N, the subchannel resource is used by being divided into a frequency base or a time base. In other words, the subchannel selecting module (803 of FIG. 8) uses the subchannel resource according to the frequency reuse factor N depending on each subsegment by dividing the subchannel resource into a frequency base or a time base. Herein, when the frequency reuse factor is N, 1/N of all possible frequency bands is used FIG. 10 is a diagram showing an example of allocating resources to a frequency axis when frequency reuse factor according to an exemplary embodiment of the present invention is 2.

In particular, FIG. 10A shows the subchannel generation in the PUSC type of the IEEE 802.16e system. The existing system selects one subcarrier in a total of 24 sets of subcarriers to form 24 new sets of subcarriers. A pair of 24 sets of subcarriers over two OFDM symbols forms one subchannel.

FIG. 10B shows an example of separating the subchannels into a frequency base by ½. The subcarriers are selected only in 12 sets of the 24 sets of subcarriers to form 12 sets of subcarriers and four sets of subcarriers of 12 sets over four OFDM symbols to form one subchannel.

Hereinafter, FIGS. 11 to 24 show results of simulating the exemplary embodiments of the present invention. Herein, the femtocell base station apparatus 1 sets the inside of building, which is positioned in a macrocell base station area of a wide radius existing outdoors, as the femtocell coverage area for fewer subscribers.

First, FIGS. 11 to 16 show the detection performance of the macrocell preamble within the femtocell coverage area.

FIG. 11 is a diagram showing the detection performance of the macrocell preambles within the femtocell coverage areas when the preamble to which only power allocation is applied is used.

Referring to FIG. 11, the detection failure probability of the macrocell preamble is $10^{-2}$ or less outside the building. The detection failure probability of the macrocell preamble is $10^{-1}$ or more inside the building. A portion of an area where the detection failure probability of the macrocell preamble is $10^{-2}$ or more to $10^{-1}$ is shown at the border of the inside and outside of the building.

As such, when only power is allocated, it can be appreciated that the detection failure probability is very high within the femtocell coverage area.

Figure 12:
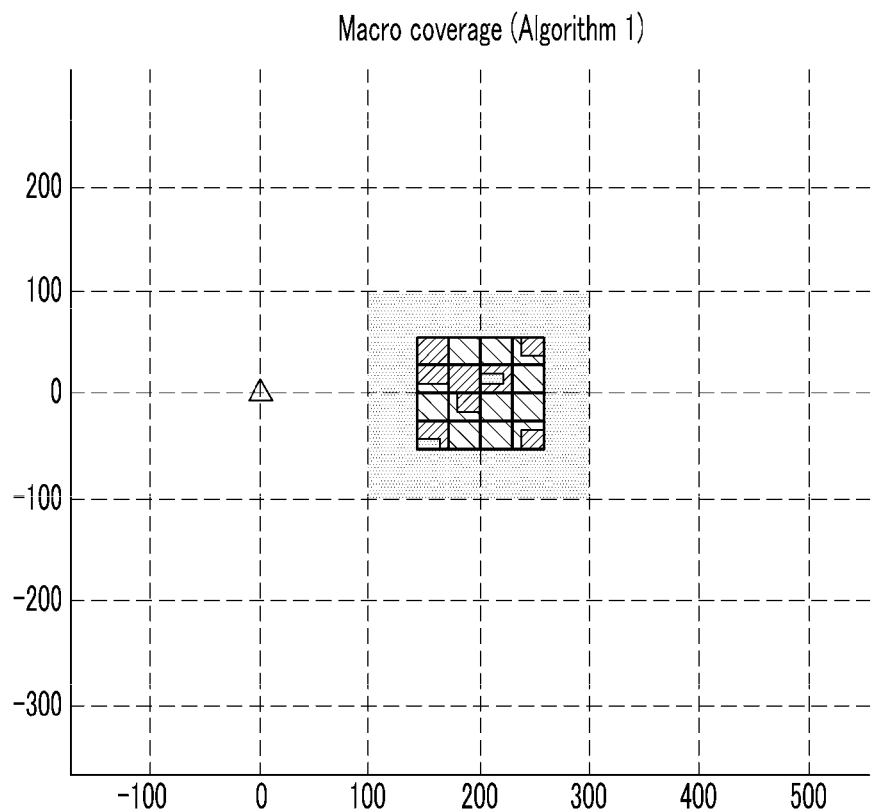
FIG. 12 is a diagram showing the detection performance of a macrocell preamble within a femtocell coverage area when a preamble select algorithm according to the first embodiment of the present invention is used.

FIG. 12 is a diagram showing the detection performance of the macrocell preambles within the femtocell coverage area when the preamble select algorithm according to the first embodiment of the present invention is used. In other words, it corresponds to a case of using a first preamble select algorithm of the preamble selector 700 of FIG. 3.

Referring to FIG. 12, the detection failure probability of the macrocell preamble is $10^{-2}$ or less outside the building. An area where the detection failure probability of the macrocell preamble is $10^{-1}$ or more and an area where the detection failure probability of the macrocell preamble is $10^{-2}$ or more to $10^{-1}$ or less are evenly shown inside the building. At this time, an area where the detection failure probability of the macrocell preamble is $10^{-1}$ or more is greater.

FIG. 13 is a diagram showing the detection performance of the macrocell preambles within the femtocell coverage area when a preamble select algorithm according to the second embodiment of the present invention is used. In other words, it corresponds to a case of using a second preamble select algorithm of the preamble selector 700 of FIG. 4.

Referring to FIG. 13, the detection failure probability of the macrocell preamble is $10^{-2}$ or less outside the building. An area where the detection failure probability of the macrocell preamble is $10^{-1}$ or more and an area where the detection failure probability of the macrocell preamble is $10^{-2}$ or more to $10^{-1}$ or less are similarly shown inside the building. However, an area where the detection failure probability of the macrocell preamble is $10^{-2}$ or more to $10^{-1}$ or less is somewhat greater.

FIG. 14 is a diagram showing the detection performance of the macrocell preamble within the femtocell coverage area when the preamble select algorithm according to the third embodiment of the present invention is used. In other words, it corresponds to a case of using a third preamble select algorithm of the preamble selector 700 of FIG. 5.

Referring to FIG. 14, the detection failure probability of the macrocell preamble is $10^{-2}$ or less outside the building. An area where the detection failure probability of the macrocell preamble is $10^{-2}$ or more to $10^{-1}$ or less is shown to be much greater than an area where the detection failure probability of the macrocell preamble is $10^{-1}$ or more, inside the building. A portion of an area where the detection failure probability of the macrocell preamble is $10^{-2}$ or less is shown.

FIG. 15 is a diagram showing the detection performance of the macrocell preamble within the femtocell coverage area when the preamble select algorithm according to the fourth embodiment of the present invention is used. In other words, it corresponds to a case of using a fourth preamble select algorithm of the preamble selector 700 of FIG. 6.

Referring to FIG. 15, the detection failure probability of the macrocell preamble is $10^{-2}$ or less outside the building. An area where the detection failure probability of the macrocell preamble is $10^{-1}$ or more is shown to be much greater than an area where the detection failure probability of the macrocell preamble is $10^{-2}$ or more to $10^{-1}$ or less, inside the building. A significant portion of an area where the detection failure probability of the macrocell preamble is $10^{-2}$ or less is shown.

FIG. 16 is a diagram showing the detection performance probability of the macrocell preamble within the femtocell coverage area when another preamble selector according to the fifth embodiment of the present invention selects a preamble. In other words, it corresponds to a case of using a fifth preamble select algorithm of the preamble selector 700 of FIG. 6.

Referring to FIG. 16, the detection failure probability of the macrocell preamble is $10^{-2}$ or less outside the building. Most of area where the detection failure probability of the macrocell preamble is $10^{-2}$ or less is shown and a portion of an area where the detection failure probability of the macrocell preamble is $10^{-2}$ or more to $10^{-1}$ or less is shown, inside the building. No area where the detection failure probability of the macrocell preamble is $10^{-1}$ or more is shown.

As such, referring to FIGS. 12 to 16, going from the first exemplary embodiment of the present invention to the fifth exemplary embodiment, it can be appreciated that the area where the detection failure probability of the macrocell preamble is $10^{-2}$ or less is greater. In other words, the detection failure probability of the macrocell preamble becomes low, such that it can be confirmed that the detection performance of the macrocell preamble is increased.

Next, FIGS. 17 to 22 show the detection performance of the femtocell preamble within the femtocell coverage area. At this time, one thick square represents one femtocell coverage area.

First, FIG. 17 is a diagram showing the detection performance of a femtocell preamble within a femtocell coverage area when a preamble to which only power allocation is applied is used.

Referring to FIG. 17, an area where the detection failure probability of all the femtocell preambles is $10^{-2}$ or less is shown inside the femtocell coverage area.

An area where the detection failure probability of all the femtocell preambles is $10^{-1}$ or more is shown outside of the femtocell coverage area. In other words, the detection probability of the femtocell preamble is high inside of the femtocell coverage area even though only power is allocated.

Figure 18:
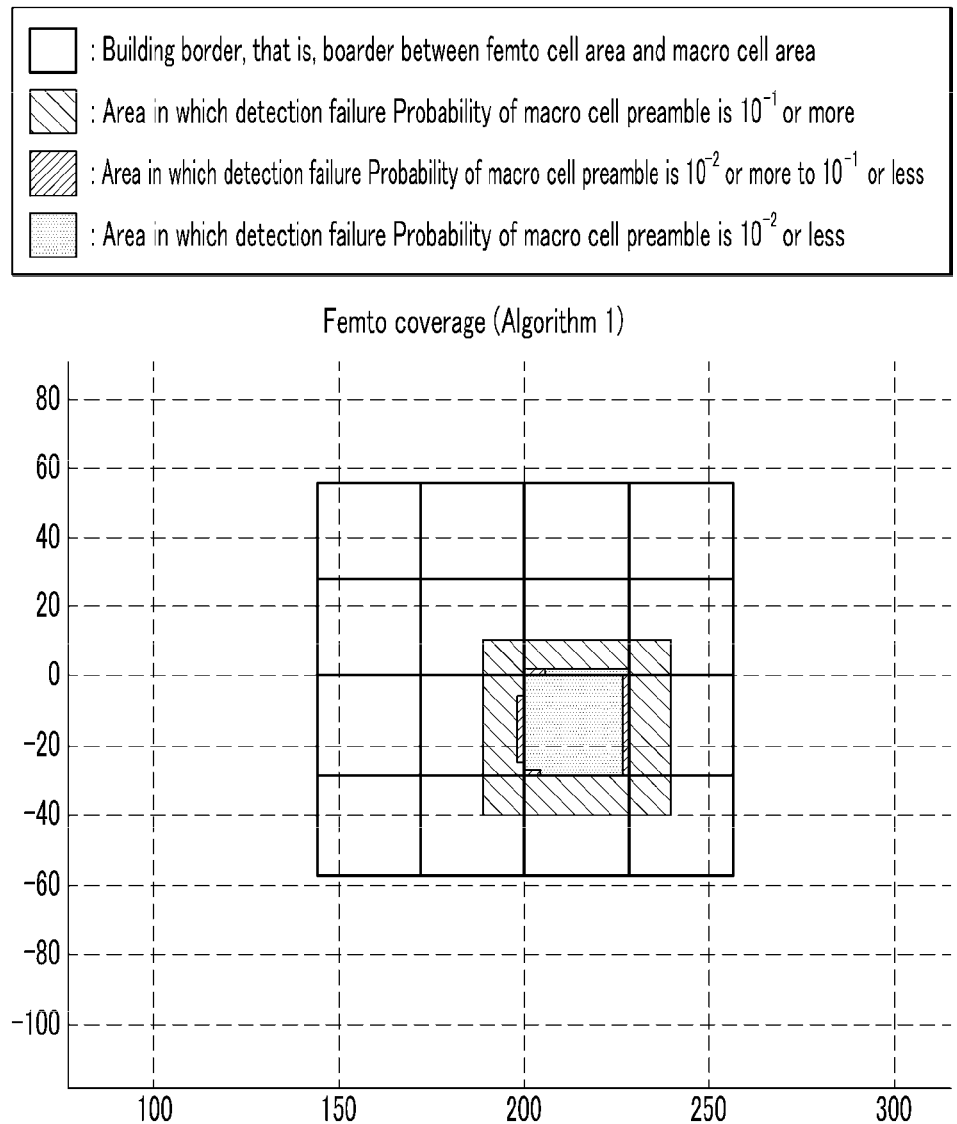
FIG. 18 is a diagram showing the detection performance of a femtocell preamble within a femtocell coverage area when a preamble select algorithm according to the first embodiment of the present invention is used.

FIG. 18 is a diagram showing the detection performance of the femtocell preamble within the femtocell coverage area when the preamble select algorithm according to the first embodiment of the present invention is used. In other words, it corresponds to a case of using the first preamble select algorithm of the preamble selector 700 of FIG. 3.

Referring to FIG. 18, an area where the detection failure probability of all the femtocell preambles is $10^{-2}$ or less is shown inside the femtocell coverage area. An area where the detection failure probability of all the femtocell preambles is $10^{-1}$ or more is shown outside the femtocell coverage area. In other words, it is shown similar to FIG. 17.

FIG. 19 is a diagram showing the detection performance of the femtocell preamble within the femtocell coverage area when the preamble select algorithm according to the second embodiment of the present invention is used. In other words, it corresponds to a case of using the second preamble select algorithm of the preamble selector 700 of FIG. 4.

Referring to FIG. 19, an area where the detection failure probability of all the femtocell preambles is $10^{-2}$ or less is shown inside the femtocell coverage area.

An area where the detection failure probability of the femtocell preambles is approximately $10^{-1}$ or more is shown outside the femtocell coverage area. However, a portion of an area where the detection failure probability of the macrocell preamble is $10^{-2}$ or more to $10^{-1}$ or less is shown. Further, a very small area where the detection failure probability of the femtocell preamble is $10^{-2}$ or less is shown.

Figure 20:
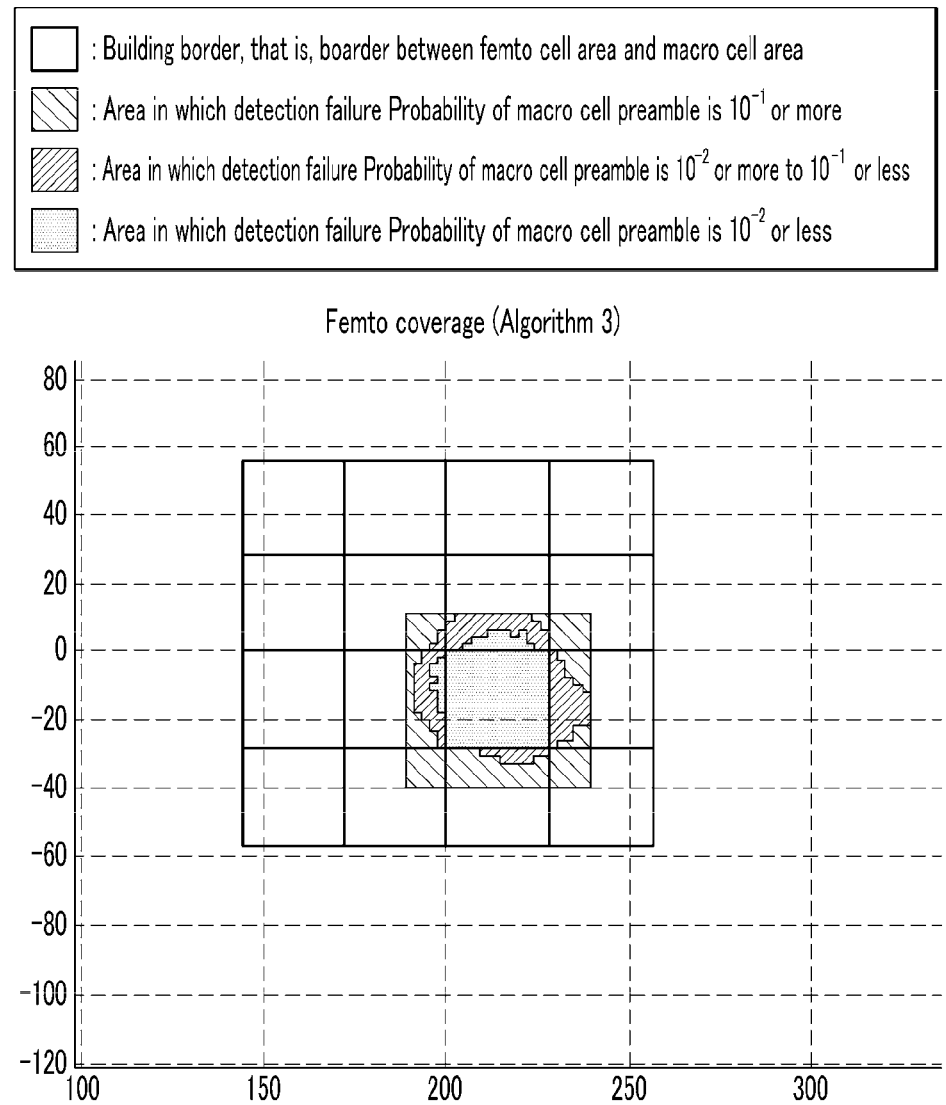
FIG. 20 is a diagram showing the detection performance of a femtocell preamble within a femtocell coverage area when a preamble select algorithm according to the third embodiment of the present invention is used.

FIG. 20 is a diagram showing the detection performance of the femtocell preamble within the femtocell coverage area when the preamble select algorithm according to the third embodiment of the present invention is used. In other words, it corresponds to a case of using the first preamble select algorithm of the preamble selector 700 of FIG. 5.

Referring to FIG. 20, an area where the detection failure probability of all the femtocell preambles is $10^{-2}$ or less is shown inside the femtocell coverage area. Most of the area where the detection failure probability of the femtocell preamble is $10^{-1}$ or more is shown, but a significant portion of an area where the detection failure probability of the femtocell preamble is $10^{-2}$ or more to $10^{-1}$ or less is shown, outside the femtocell coverage area. In addition, a portion of an area where the detection failure probability of the femtocell preamble is $10^{-2}$ or less is shown.

Figure 21:
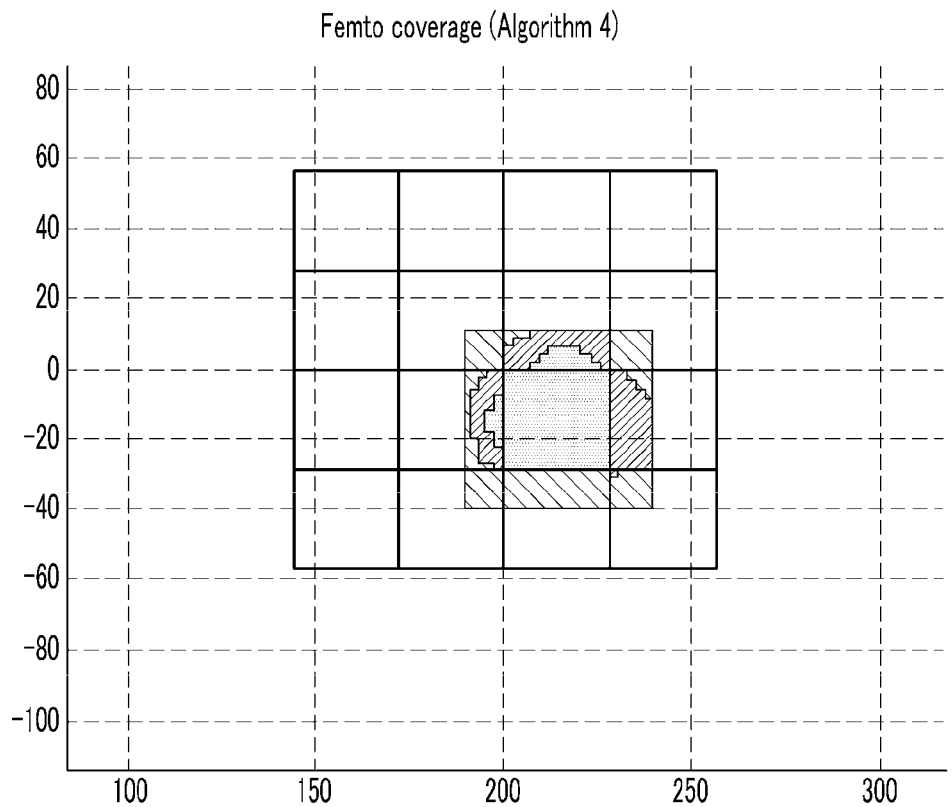
FIG. 21 is a diagram showing the detection performance of a femtocell preamble within a femtocell coverage area when a preamble select algorithm according to the fourth embodiment of the present invention is used.

FIG. 21 is a diagram showing the detection performance of the femtocell preamble within the femtocell coverage area when the preamble select algorithm according to the fourth embodiment of the present invention is used. In other words, it corresponds to a case of using the fourth preamble select algorithm of the preamble selector 700 of FIG. 6.

Referring to FIG. 21, an area where the detection failure probability of all the femtocell preambles is $10^{-2}$ or less is shown inside the femtocell coverage area. An area where the detection failure probability of all the femtocell preambles is approximately $10^{-1}$ or more is shown outside the femtocell coverage area. However, a significant portion of an area where the detection failure probability of the femtocell preamble is $10^{-2}$ or more to $10^{-1}$ or less is shown. In addition, a portion of an area where the detection failure probability of the femtocell preamble $10^{-2}$ or less is shown.

FIG. 22 is a diagram showing the detection performance of the femtocell preamble within the femtocell coverage area when the preamble select algorithm according to the fifth embodiment of the present invention is used. In other words, it corresponds to a case of using the fifth preamble select algorithm of the preamble selector 700 of FIG. 7.

Referring to FIG. 22, an area where the detection failure probability of all the femtocell preambles is $10^{-2}$ or less is shown inside the femtocell coverage area. An area where the detection failure probability of the femtocell preamble is $10^{-1}$ or more and an area where the detection failure probability of the femtocell preamble is $10^{-2}$ or more to $10^{-1}$ or less are similarly shown outside the building.

As such, going from the first exemplary embodiment of the present invention to the fifth exemplary embodiment, it can be appreciated that the area where the detection failure probability of the femtocell preamble is increased.

Figure 23:
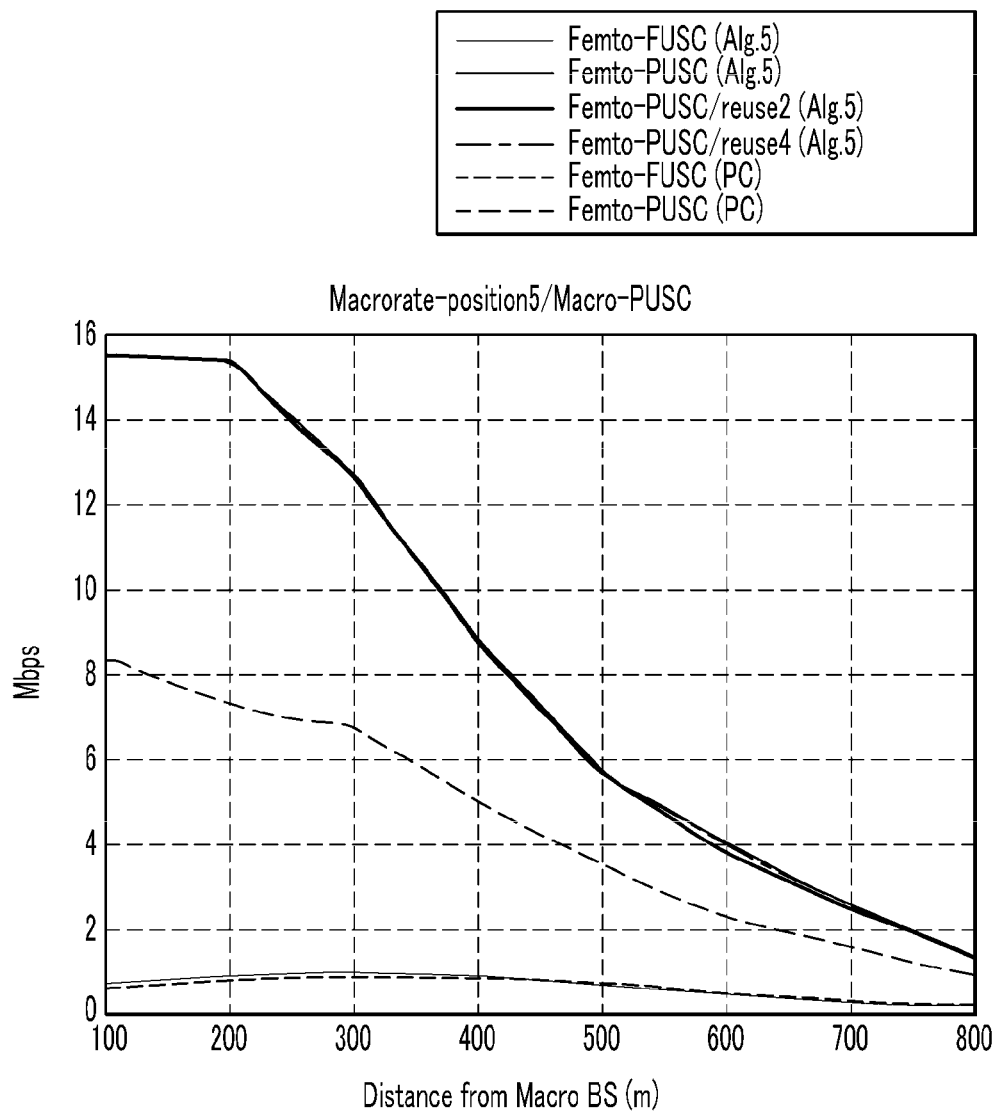
FIG. 23 is a graph showing a data rate of a macrocell user within the femtocell coverage area according to the exemplary embodiments of the present invention.

FIG. 23 is a graph showing a data rate of a macrocell user within the femtocell coverage area according to the exemplary embodiments of the present invention. In other words, it shows results of comparing data rates in the case where the segment and the preamble are allocated using the fifth exemplary embodiment of the present invention and in the case where only power is allocated.

Referring to FIG. 23, the data rate of the macrocell terminal of the outer area is shown in the femtocell coverage area. As the femtocell base station apparatus 1 is away from the macrocell, the data rate becomes low.

In particular, when the fifth exemplary embodiment of the present invention is applied, the PUSC is used, the frequency reuse factor is 2 and 4, and the data rate is high. Further, as the femtocell base station apparatus 1 is away from the macrocell, the data rate is the most sharply reduced.

At this time, although the PUSC is used, the data rate is low when only the power control (PC) is performed.

Further, when the subchannel in the FUSC type is used regardless of whether the fifth exemplary embodiment of the present invention is applied, the data rate is lowest.

Therefore, when the femtocell base station apparatus 1 is far away from the macrocell, it should perform the transmission at low power. In this case, when transmitting an increased power per subchannel using the fewer subchannels in the existing PUSC type, the higher performance is shown.

When the femtocell base station apparatus 1 uses the subchannel in the FUSC type, the macrocell user cannot perform communication in the femtocell coverage area. However, when the femtocell base station apparatus 1 uses the subchannel in the PUSC type and the fifth exemplary embodiment of the present invention is applied, better performance is shown as compared to the case where only the power is allocated.

Figure 24:
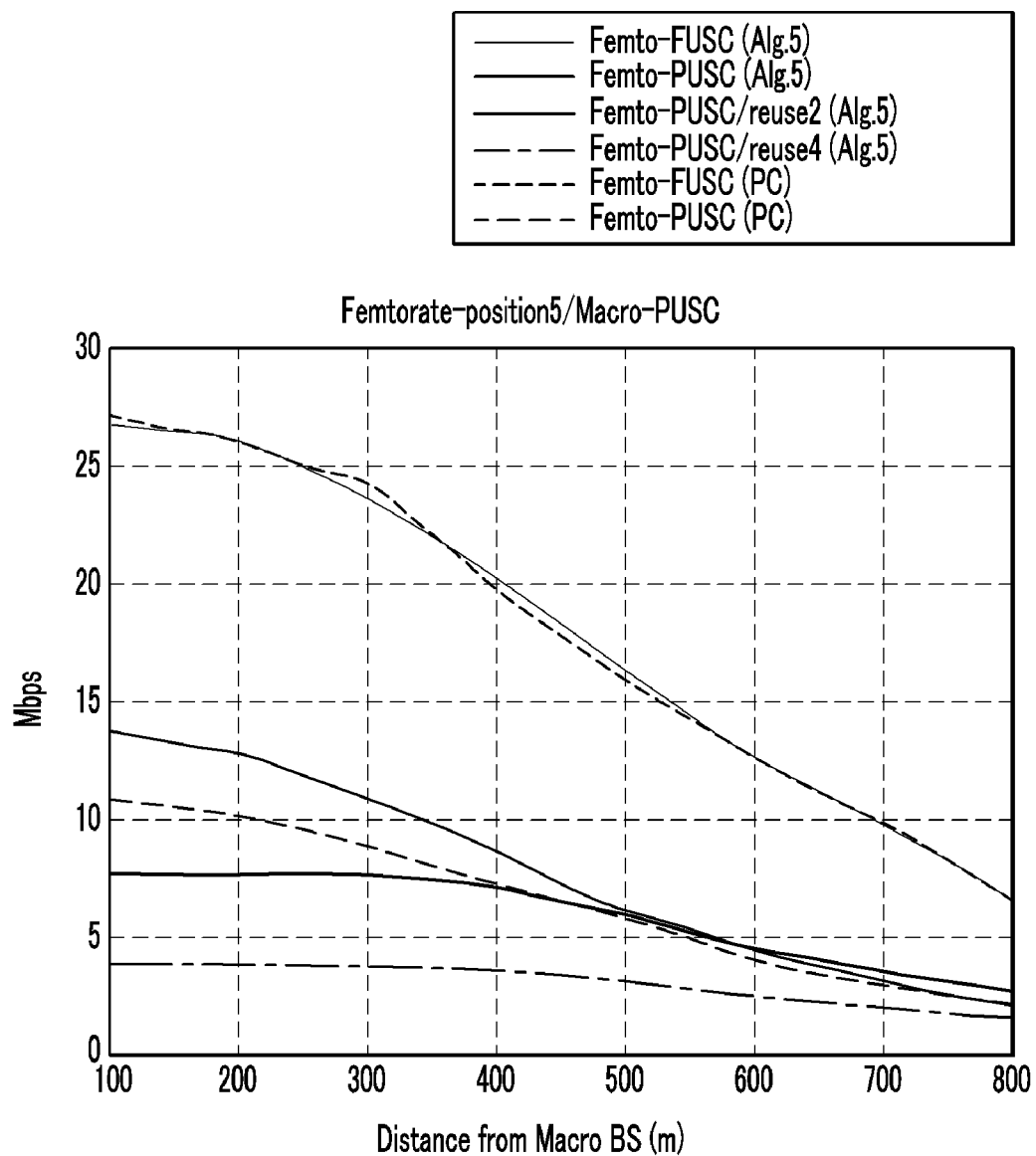
FIG. 24 is a graph showing a data rate of a femtocell user within the femtocell coverage area according to the exemplary embodiments of the present invention.

FIG. 24 is a graph showing a data rate of the femtocell user within the femtocell coverage area according to the exemplary embodiments of the present invention.

Referring to FIG. 24, as the femtocell base station apparatus 1 is far away from the macrocell, the data rate becomes low.

In particular, when the femtocell base station apparatus 1 uses the subchannel in the FUSC type regardless of whether the fifth exemplary embodiment of the present invention is applied, the data rate is highest. However, the macrocell user cannot perform communication in the femtocell coverage area, such that the femtocell base station apparatus 1 should use the subchannel in the PUSC type.

In addition, when the subchannel in the PUSC type is used, the case of using the fifth exemplary embodiment of the present invention shows higher performance than the case where only the power is allocated.

According to an exemplary embodiment of the present invention, it is possible to perform the preamble detection of the macrocell user and MAP/FCH (frame control header) decoding even within the femtocell base station by minimizing the change of the existing standard or using the existing standard as it is, making it possible to minimize damage of the macrocell and maximally secure the area of the femtocell.

The femtocell base station performs the self-configuration so as to grasp the environment of the peripheral macrocells and the femtocells and minimize damage to the outside without being subjected to control of the macrocell base station or the outside.

Therefore, it is possible to solve the shadow area of the macrocell area at a low cost without installing a macrocell base station due to the installation of the femtocell base station.

The above-mentioned exemplary embodiments of the present invention are not embodied only by an apparatus and/or method. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A femtocell base station apparatus that is installed at a home positioned in a macrocell coverage area to have a separate femtocell coverage area, comprising:
    a preamble extractor that extracts preambles from signals received from adjacent macrocells and femtocells;
    a power allocator that uses macrocell preambles from among the extracted preambles to set transmission power for transmitting a signal in the femtocell coverage area;
    a preamble selector that uses correlation values between the macrocell preambles and pre-stored femtocell preambles to select femtocell preambles; and
    a resource allocator that allocates resources for data transmission in the femtocells, considering signal interference size between the adjacent macrocells and the femtocells.

2. The femtocell base station apparatus of claim 1, wherein the preamble selector includes:
    a correlation value calculating module that calculates differential correlation values between the macrocell preambles and the pre-stored femtocell preambles; and
    a preamble selecting module that selects the femtocell preambles having the lowest differential correlation value of the differential correlation values.

3. The femtocell base station apparatus of claim 2, wherein the preamble selector further includes a segment selecting module that selects a segment that is lowest in a sum of the received signal energy for each segment among signals received from the adjacent macrocells, and
    wherein the correlation value calculating module calculates the differential correlation values between the preambles of the segments selected by the segment selecting module and the preambles of the pre-stored femtocell.

4. The femtocell base station apparatus of claim 2, wherein the preamble selector further includes a storage module that stores femtocell preambles that are punctured by the number of predefined patterns, and
    wherein the correlation value calculating module calculates the differential correlation values between the macrocell preamble and the punctured femtocell preambles stored in the storage module, considering the number of predefined patterns.

5. The femtocell base station apparatus of claim 2, wherein the preamble selector further includes a segment selecting module that selects a segment that is lowest in a sum of the received signal energy for each segment among signals received from the adjacent macrocells, and
    wherein the correlation value calculating module calculates the differential correlation values between the preambles of the segments selected by the segment selecting module and the preambles of the pre-stored femtocells.

6. The femtocell base station apparatus of claim 1, wherein the preamble selector includes:
    a storage module that stores the femtocell preambles that are punctured by the number of predefined patterns;
    a subsegment selecting module that selects a subsegment that is lowest in a sum of energy of virtual subsegments according to punctured patterns among signals received from the adjacent macrocells;
    a correlation value calculating module that calculates the differential correlation values between the preambles of the subsegments selected by the subsegment selecting module and the punctured femtocell preambles stored in the storage module, considering the number of predefined patterns; and
    a preamble selecting module that selects the femtocell preambles having the lowest differential correlation values of the differential correlation values.

7. The femtocell base station apparatus of claim 4, wherein the resource allocator configures frame control header signals so that the frame control header signals exist at different positions for each subsegment by repeating the frame control header control signals.

8. The femtocell base station apparatus of claim 1, wherein the resource allocator includes:
    a measuring module that calculates an interference to noise ratio by measuring the received signal size of the macrocell preambles; and
    a subchannel selecting module that determines a subchannel mechanism according to the interference to noise ratio.

9. The femtocell base station apparatus of claim 8, wherein the subchannel selecting module allocates subchannel resources in a partial usage of subchannels (PUSC) type to use subchannel resources of a 1/reuse factor that is orthogonal to a time base or a frequency base.

10. A self-configuring method of a femtocell base station, comprising:
    extracting preambles from signals received from adjacent macrocells and femtocells;
    setting transmission power of the femtocell base station using macrocell preambles from among the extracted preambles;
    selecting the preambles of the femtocell base station using the correlation values between the macrocell preambles and the pre-stored femtocell preambles; and
    allocating resources for data transmission of the femtocell base station, considering signal interference size between the adjacent macrocells and the femtocells.

11. The self-configuring method of a femtocell base station of claim 10, wherein the selecting includes:
    calculating differential correlation values between the macrocell preambles and the pre-stored femtocell preambles; and
    selecting a femtocell preamble having the lowest differential correlation values of the differential correlation values.

12. The self-configuring method of a femtocell base station of claim 11, further comprising:
    selecting a segment that is lowest in a sum of the received signal energy for each segment among the signals received from the adjacent macrocells, wherein the calculating calculates the differential correlation values between the preambles of the selected segments and the preambles of the pre-stored femtocells.

13. The self-configuring method of a femtocell base station of claim 11, wherein the calculating calculates the differential correlation values between the macrocell preambles and the pre-stored femtocell preambles that are punctured by the number of predefined patterns, considering the number of pre-stored patterns.

14. The self-configuring method of a femtocell base station of claim 13, further comprising selecting a segment that is lowest in a sum of the received signal energy for each segment among the signals received from the adjacent macrocells, and
wherein the calculating calculates the differential correlation values between the preambles of the selected segments and the pre-stored femtocell preambles that are punctured by the number of predefined patterns.

15. The self-configuring method of a femtocell base station of claim 10, wherein the selecting includes:
selecting a subsegment that is lowest in a sum of energy of virtual subsegments according to punctured patterns among signals received from the adjacent macrocells;
calculating the differential correlation values between the preambles of the selected subsegments selected and the pre-stored femtocell preambles that are punctured by the number of predefined patterns, considering the number of predefined patterns; and
selecting a femtocell preamble having the lowest differential correlation values among the differential correlation values.

16. The self-configuring method of a femtocell base station of claim 13, wherein the allocating the resource configures frame control header signals so that the frame control header signals exist at different positions for each subsegment by repeating the frame control header signals.

17. The self-configuring method of a femtocell base station of claim 10, wherein the allocating the resources includes:
calculating a signal to interference ratio by measuring the received signal size of the macrocell preambles; and
determining a subchannel mechanism according to the interference to noise ratio.

18. The self-configuring method of a femtocell base station of claim 17, wherein the determining allocates subchannel resources in a partial usage of subchannels (PUSC) type to use subchannel resources of a 1/reuse factor that is orthogonal to a time base or a frequency base.

* * * * *